US011628846B2

(12) United States Patent
Varughese et al.

(10) Patent No.: US 11,628,846 B2
(45) Date of Patent: Apr. 18, 2023

(54) UWB BASED IN-VEHICLE LOCATION AND IDENTITY VERIFICATION AND BEHAVIOR SCORING VIA MOBILE ACCESS DEVICES OF VEHICULAR PASSIVE ACCESS SYSTEMS

(71) Applicants: DENSO International America, Inc., Southfield, MI (US); DENSO CORPORATION, Kariya (JP)

(72) Inventors: Sibu Varughese, Sterling Heights, MI (US); Martin Nespolo, Grosse Pointe Woods, MI (US); Gareth Webb, New Hudson, MI (US); Thomas Krzyzak, Livonia, MI (US); Wilson Yim, Troy, MI (US); Matthew Johnson, Royal Oak, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 349 days.

(21) Appl. No.: 16/942,963

(22) Filed: Jul. 30, 2020

(65) Prior Publication Data
US 2022/0032920 A1 Feb. 3, 2022

(51) Int. Cl.
*B60W 40/09* (2012.01)
*G07C 5/08* (2006.01)
(Continued)

(52) U.S. Cl.
CPC ......... *B60W 40/09* (2013.01); *G06K 7/10306* (2013.01); *G06Q 40/08* (2013.01);
(Continued)

(58) Field of Classification Search
CPC .......... B60W 40/09; B60W 2540/043; B60W 2040/0809; B60W 2540/30; H04W 4/029;
(Continued)

(56) References Cited

U.S. PATENT DOCUMENTS 5,321,614 A * 6/1994 Ashworth ............ G05D 1/0227
318/587
9,619,203 B2 * 4/2017 Tamir ........................ G06F 7/00
(Continued)

FOREIGN PATENT DOCUMENTS

BR   102014017465 A2   2/2016
CN   104574593 A   4/2015
(Continued)

*Primary Examiner* — Gertrude Arthur Jeanglaude
(74) *Attorney, Agent, or Firm* — Harness, Dickey & Pierce, P.L.C.

(57) ABSTRACT

A mobile access device includes a memory, a user interface, a transceiver, and a control module. The memory stores a service application. The user interface receives an input from a user to execute the service application. The transceiver signals a vehicle to establish a connection and initiate a location determining process to determine a location of the mobile access device within the vehicle. The control module: determines whether the service application is permitted to be executed based on the location of the mobile access device; based on the location of the mobile access device, performs an identity verification process to verify identity of at least one of the user or the mobile access device; and tracks driving behavior of the user based on (i) whether the service application is permitted to be executed, and (ii) a result of the identity verification process.

20 Claims, 12 Drawing Sheets

(51) Int. Cl.
*G07C 5/00* (2006.01)
*G06K 7/10* (2006.01)
*H04W 4/029* (2018.01)
*G06Q 40/08* (2012.01)
*G06V 20/59* (2022.01)
*B60W 40/08* (2012.01)

(52) U.S. Cl.
CPC ............ *G06V 20/59* (2022.01); *G07C 5/008* (2013.01); *G07C 5/0808* (2013.01); *H04W 4/029* (2018.02); *B60W 2040/0809* (2013.01); *B60W 2540/043* (2020.02); *B60W 2540/30* (2013.01)

(58) Field of Classification Search
CPC .... G06V 20/59; G06K 7/10306; G06Q 40/08; G07C 5/008; G07C 5/0808
See application file for complete search history.

(56) References Cited

U.S. PATENT DOCUMENTS

| | | | |
|---|---|---|---|
| 9,688,247 B1 | 6/2017 | Jayaraman et al. | |
| 9,794,753 B1 | 10/2017 | Stitt et al. | |
| 9,894,492 B1 | 2/2018 | Elangovan et al. | |
| 10,002,479 B2 | 6/2018 | Oz et al. | |
| 10,244,476 B2 | 3/2019 | Elangovan et al. | |
| 10,328,898 B2 | 6/2019 | Golsch et al. | |
| 10,328,899 B2 | 6/2019 | Golsch | |
| 10,328,900 B1 | 6/2019 | Yakovenko et al. | |
| 2009/0305667 A1* | 12/2009 | Schultz | H04M 3/382 455/410 |
| 2011/0215921 A1 | 9/2011 | Ben Ayed et al. | |
| 2012/0006610 A1* | 1/2012 | Wallace | H04M 1/67 180/272 |
| 2012/0045058 A1 | 2/2012 | Weghaus | |
| 2013/0005352 A1* | 1/2013 | Jones | G07B 15/00 455/456.1 |
| 2014/0274013 A1 | 9/2014 | Santavicca | |
| 2015/0148989 A1 | 5/2015 | Cooper et al. | |
| 2015/0161832 A1 | 6/2015 | Esselink et al. | |
| 2015/0310681 A1 | 10/2015 | Avery et al. | |
| 2015/0356797 A1 | 12/2015 | McBride et al. | |
| 2016/0150407 A1 | 5/2016 | Michaud et al. | |
| 2017/0062938 A1 | 3/2017 | Cheng et al. | |
| 2017/0104589 A1 | 4/2017 | Lambert et al. | |
| 2017/0132533 A1 | 5/2017 | Darnell et al. | |
| 2017/0309098 A1 | 10/2017 | Watters et al. | |
| 2017/0330402 A1 | 11/2017 | Menard et al. | |
| 2018/0029560 A1 | 2/2018 | Mohaupt et al. | |
| 2018/0099643 A1 | 4/2018 | Golsch et al. | |
| 2018/0103414 A1 | 4/2018 | Golsch | |
| 2018/0126952 A1 | 5/2018 | Niemiec | |
| 2018/0154865 A1 | 6/2018 | Bianchi, III et al. | |
| 2018/0269565 A1 | 9/2018 | Guthrie et al. | |

FOREIGN PATENT DOCUMENTS

| | | |
|---|---|---|
| WO | WO-16156682 A1 | 10/2016 |
| WO | WO-2017181050 A1 | 10/2017 |
| WO | WO-18040641 A1 | 3/2018 |

* cited by examiner

UWB BASED IN-VEHICLE LOCATION AND IDENTITY VERIFICATION AND BEHAVIOR SCORING VIA MOBILE ACCESS DEVICES OF VEHICULAR PASSIVE ACCESS SYSTEMS

FIELD

The present disclosure relates to passive entry/passive start systems.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Conventional passive entry/passive start (PEPS) systems allow keyless entry including providing a user access to various vehicle functions if the user possesses a key fob that has been paired with an in-vehicle PEPS electronic control unit (or PEPS module). As an example, the user in possession of the key fob may approach a vehicle having the PEPS module. The key fob communicates with the PEPS module and if the key fob is authenticated, the PEPS module may unlock doors of the vehicle. The PEPS module (i) performs an authentication process to determine if the key fob is authorized to access the vehicle, and (ii) determines a location of the key fob relative to the vehicle. The authentication process may include the exchange of an encrypted password or signature. If the password or signature is correct, then the key fob is determined to be authorized. Location of the key fob may be determined based on, for example, strength of a signal received from the key fob. If the key fob is authenticated and is located within an authorized zone of the vehicle, then access to the interior of the vehicle is permitted without use of a traditional key.

As another example, the user in possession of the key fob may activate a vehicle function by pushing a button on the key fob. In response to pushing the button, the key fob communicates with the PEPS module and if the key fob is authenticated and within a predetermined distance of the vehicle, the PEPS module performs the stated function (e.g., starts the vehicle, opens a door, sets off an alarm, etc.) associated with the button pressed on the key fob. The communication performed for the two examples may include the key fob and the PEPS module performing a one-way low frequency (LF) (e.g., 125 kilo-Hertz (kHz)) wake-up function and a one-way or two-way radio frequency (RF) authentication function.

A phone as a key (PaaK) vehicle access system can operate similarly as the stated PEPs system, except the vehicle is accessed using a mobile phone rather than a key fob. As an example, the mobile phone can communicate with a PaaK module or a telematics control unit (TCU) in the vehicle to begin an access pairing process. The mobile phone and either the PaaK module or the TCU perform the access pairing process to establish a trust relationship. The pairing process can include Bluetooth® pairing whereby: security information is exchanged between the mobile phone and the vehicle directly; a mobile phone address, a mobile phone identity resolving key, a reservation identifier and/or an encryption key are exchanged via a cloud-based network; and/or the mobile phone presents a certificate to the vehicle, where the certificate is signed by (i) the mobile phone, (ii) a trusted security signing authority such as a manufacturer of the vehicle, and/or (iii) a trusted third party. In the case of a certificate, the certificate can include an identifier of a person authorized to access a vehicle, an identifier of a cloud-based network authorized to transfer the certificate, an identifier of a rental or lease agreement of the vehicle, an identifier of the vehicle, a date and time period during which the vehicle is permitted for use by the authorized person, and/or other restrictions and/or access/license information.

For passive entry, some user action is typically needed to initiate a process of waking up a key fob or mobile phone (referred to as mobile access devices). For example, this may include a user approaching the vehicle with a mobile access device and/or touching and/or pulling on a door handle. When a PEPS module or a PaaK module, which are referred to as access modules, detects this behavior, the access module performs a localization process to begin searching for and waking up the key fob.

A controller of the key fob measures a LF signal level during communication with the access module. The controller determines a received signal strength indicator (RSSI) and provides the RSSI to the access module. The access module then determines a location of the key fob based on the RSSI.

A smartphone, a wearable device, and/or other smart portable network device may perform as a key fob. The smart portable network devices may enable various vehicle functions and long range distancing features, such as passive welcome lighting, distance bounding on remote parking applications, etc.

SUMMARY

A mobile access device is provided and includes a memory, a user interface, a transceiver, and a control module. The memory is configured to store a service application. The user interface is configured to receive an input from a user to execute the service application. The transceiver is configured to signal a vehicle to establish a connection and initiate a location determining process to determine a location of the mobile access device within the vehicle. The control module is configured to: determine whether the service application is permitted to be executed based on the location of the mobile access device; based on the location of the mobile access device, perform an identity verification process to verify identity of at least one of the user or the mobile access device; and track driving behavior of the user based on (i) whether the service application is permitted to be executed, and (ii) a result of the identity verification process.

In other features, the service application is a passenger or package transport service application.

In other features, the control module is configured to via the transceiver perform an ultra-wideband signal exchange with a module of the vehicle to determine the location of the mobile access device.

In other features, the control module is configured to determine the location of the mobile access device within the vehicle independent of the vehicle.

In other features, the mobile access device further includes one or more cameras. The control module is configured to determine the location of the mobile access device within the vehicle based on images captured via the one or more cameras.

In other features, the control module is configured to cease executing the service application when the mobile access device is outside a predetermined area of a driver seat of the vehicle.

In other features, the mobile access device further includes one or more cameras. The control module is configured to: capture images via the one or more cameras; based on the images, determine whether the user is driving the vehicle; and cease operation of the service application, in response to determining the user is not driving the vehicle.

In other features, the transceiver is configured to receive a signal from the vehicle. The signal indicates whether the user is likely driving the vehicle. The control module is configured to cease executing the service application in response to determining the user is likely not driving the vehicle.

In other features, the control module is configured to: track and report driving behavior to a station of a service company associated with the service application; receive a response signal from the station based on the reported driving behavior; and based on the response signal, indicate to the user at least one of (i) suggested driving behavior changes, (ii) an indicator to return the vehicle to the station, or (iii) information indicating operation of the vehicle is now limited.

In other features, the control module is configured to: track and report driving behavior to a station of an insurance company associated with at least one of the user or the vehicle; receive a response signal from the station based on the reported driving behavior; and based on the response signal, indicate to the user at least one of (i) suggested driving behavior changes or (ii) insurance rates.

In other features, an access system for a vehicle is provided. The access system includes a transceiver and a control module. The transceiver is configured to receive from a mobile access device a first signal indicating a service application at least one of has started or has been requested to start on the mobile access device. The control module is configured to: based on the first signal, determine a location of the mobile access device; determine whether the mobile access device is within a vicinity of a driver seat of the vehicle; in response to determining the mobile access device is within the vicinity of the driver seat, determining a likelihood that a user of the mobile access device is a current driver of the vehicle and authorized to use the service application; and indicate to the mobile access device via the transceiver at least one of (i) whether the mobile access device is within the vicinity of the driver seat, or (ii) the likelihood the user of the mobile access device is a current driver of the vehicle and is authorized to use the service application.

In other features, the control module is configured to perform an ultra-wideband signal exchange with the mobile access device to determine the location of the mobile access device within the vehicle.

In other features, the control module is configured to determine the location of the mobile access device within the vehicle based on images captured by the mobile access device.

In other features, the access system further includes one or more cameras configured to capture images of an interior of the vehicle. The control module is configured to, based on the captured images, determine a location of the mobile access device within the vehicle.

In other features, the control module is configured to signal the mobile access device to initiate an identity verification process based on whether the mobile access device is within the vicinity of the driver seat.

In other features, the control module is configured to: at least one of receive or obtain images of an interior of the vehicle; determine based on the images whether the mobile access device is facing a driver of the vehicle; and based on whether the mobile access device is facing the driver of the vehicle, signal the mobile access device to initiate an identity verification process to verify an identity of the user.

In other features, the control module is configured to: determine whether there is a passenger in a front passenger seat of the vehicle; and based on whether a passenger is in the front passenger seat of the vehicle, signal the mobile access device initiate an identity verification process to verify an identity of the user.

In other features, the control module is configured to: determine a probability of whether the user is the current driver of the vehicle, the user is a correct driver, or the user is an authorized driver of the vehicle; and based on the probability and to cease operation of the service application, signal the mobile access device at least one of (i) an indication that the user is not the current driver of the vehicle, (ii) an indication that the user is an incorrect driver, or (iii) the user is not an authorized driver of the vehicle.

In other features, the control module is configured to: track and report driving behavior to a station of a service company associated with the service application; receive a response signal from the station based on the reported driving behavior; and based on the response signal, indicate information to the user via at least one of the mobile access device or an interface of the vehicle, wherein the information includes at least one of (i) suggested driving behavior changes, (ii) an indicator to return the vehicle to the station, or (iii) information indicating operation of the vehicle is now limited.

In other features, the control module is configured to: track and report driving behavior to a station of an insurance company associated with at least one of the user or the vehicle; receive a response signal from the station based on the reported driving behavior; and based on the response signal, indicate information to the user via at least one of the mobile access device or an interface of the vehicle, wherein the information includes at least one of (i) suggested driving behavior changes or (ii) insurance rates.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A driver of a vehicle may start a service application on a mobile access device associated with, for example, driving passengers to requested destinations and/or delivering packages. The service application may be a passenger and/or package transport service application. The mobile access device may be a smart phone, a tablet, a wearable device (e.g., a smart watch), a laptop computer, or other mobile access device. When the service application is running, driving behavior may be tracked. When the owner and/or authorized user of the mobile access device is not in the driver seat of a vehicle, the service application should not be running and/or tracking driving behavior. The service application may be started inadvertently and/or by actions of an unauthorized user, for example, when the user of the mobile access device is not (i) sitting in the driver seat of the vehicle, (ii) driving the vehicle, and/or (iii) authorized to run the service application and clicks on an icon of the service application. The service application should not be executed and/or tracking driver behavior when the driver is not authorized to execute the service application.

Examples set forth herein include a PaaK system that: determines a specific location of a mobile access device within an interior of a vehicle; determines whether a user of the mobile access device is in a driver seat and driving the vehicle; verifies identity of the user of the mobile access device; and tracks and reports driving behavior when the user is a driver and is authorized to execute a service application on the mobile access device. The location determination may be Bluetooth® low-energy (BLE) and/or ultra-wideband (UWB) based. UWB signal transmission may be implemented to provide precise micro-location information.

The PaaK system may include multiple ultra-wideband (UWB) sensors installed throughout a vehicle and one or more Bluetooth® low-energy (BLE) nodes (e.g., BLE transceivers and antennas). The BLE nodes are also implemented in the vehicle and may be used to wake up and/or establish a communication link with a mobile access device (e.g., a key fob, a mobile phone, a wearable device, etc.). The UWB sensors may be used to precisely determine the location of the mobile access device relative to one or more reference points of the vehicle. As further described herein, when determining a location of a mobile access device, it is determined whether the mobile access device is in or outside of the vehicle and in or outside of one or more predefined zones relative to the corresponding vehicle. The predefined zones may include one or more zones internal and/or external to the vehicle. The internal zones may include one or more zones within a cabin of the vehicle, such as in an area including a driver seat of the vehicle.

Figure 1:
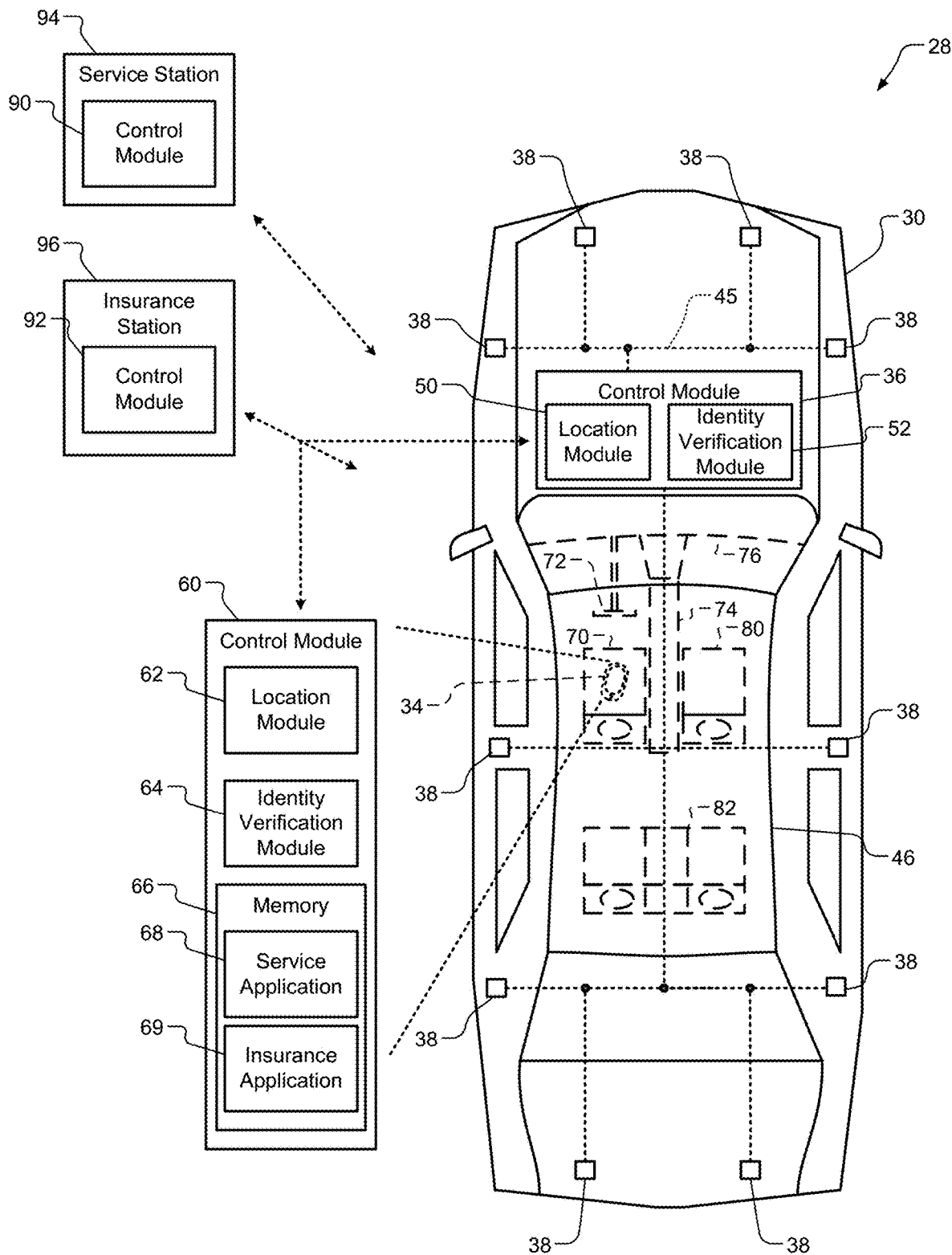
FIG. 1 is a functional block diagram of an example of a vehicle access system including a mobile access device operating in accordance with the present disclosure.

FIG. 1 shows a vehicle access system 28 that performs as a PEPS system and a PaaK system. The vehicle access system 28 includes a vehicle 30 and may include a mobile access device 34, such as any one of the mobile access devices referred to herein and/or other portable network device. The mobile access device may be, for example, a Bluetooth®-enabled and UWB-enabled communication device, such as a smart phone, smart watch, wearable electronic device, key fob, tablet device, or other device associated with a user of the vehicle 30. The user may be an owner, driver, or passenger of the vehicle 30 and/or a technician for the vehicle 30.

The vehicle 30 includes a control module 36 and antenna modules 38. One or more of the antenna modules 38 may be included in the control module 36. As an example, the antenna modules 38 may each be implemented as one or more antennas. The control module 36 may wirelessly transmit and receive BLE and/or UWB signals via the antenna modules 38 including wirelessly communicating with the mobile access devices. As an example, the UWB signals may be spread over a large bandwidth of greater than 500 Mega-Hertz (MHz) and be, for example, at UWB frequencies (e.g., 3.1-10.6 Giga-Hertz (GHz)). The BLE and/or UWB signals may be transmitted to and/or received from the mobile access devices and used to connect with and track a location and movement of the mobile access devices. Although particular numbers of antenna modules 38 are shown, any number of each may be utilized. The control module 36 may communicate with some of the antenna modules 38 wirelessly and/or via a vehicle interface 45. As an example, the vehicle interface 45 may include a controller area network (CAN) bus, a local interconnect network (LIN) for lower data-rate communication, a clock extension peripheral interface (CXPI) bus and/or one or more other vehicle interfaces.

The antenna modules 38 may be at various locations on the vehicle and transmit and receive high frequency RF (e.g., BLE) signals and/or UWB signals. Each of the antenna modules 38 includes a RF (or BLE) and/or UWB antenna and may include a control module and/or other circuitry for RF (or BLE) and/or UWB signal transmission. The antenna modules 38 may transmit BLE signals according to BLE communication protocols or, alternatively, the antenna modules 38 may communicate according to other wireless communication protocols, such as wireless fidelity (Wi-Fi). In one embodiment and to improve signal coverage relative to the vehicle 30 and improve transmission and reception characteristics, the antenna modules 38 are located in a roof 46 of the vehicle 30.

The control module 36 of the vehicle 30 may include a first location module 50 and a first identity verification module 52. The mobile access device may include a control module 60 that includes a second location module 62, a second identity verification module 64, and a memory 66. The memory 66 may store a service application 68 and/or an insurance application 69. The location modules 50 and 62 operate to determine a precise location of the mobile access device 34 in the vehicle 30. This may include determining whether the mobile access device 34 is on, within a predetermined distance of, forward of and/or above a driver seat 70 of the vehicle 30. The location of the mobile access device 34 may be relative to a reference point in the vehicle, a steering wheel 72, a center console 74, a dashboard 76, the driver seat 70, etc. Location information may indicate whether the mobile access device 34 is in or on the center console 74, dashboard 76 or overhead console (not shown). The location information may indicate (i) whether the mobile access device 34 is within a vicinity (or predetermined distance) of the driver seat 70, and/or (ii) a distance between one or more reference points on the driver seat and the mobile access device 34. The location information may indicate if the mobile access device 34 is within a predetermined distance of, on and/or above a passenger seat (e.g., front passenger seat 80 or rear passenger seat 82). The location information may further indicate whether the mobile access device 34 is rearward of the steering wheel 72.

The identity verification modules 52, 64 operate to verify the identity of a user of the mobile access device 34. This may include determining whether the user is an authorized user of the mobile access device 34, the service application 68 and/or the vehicle 30. The same or different identification information may be requested and/or obtained to determine whether the user is an authorized user of the mobile access device 34, the service application 68 and/or the vehicle 30. This may include usernames, passwords, answers to predetermined questions, keys, facial recognition, finger print recognition, etc. The applications 68, 69 may be implemented to track driving behavior and report the driving behavior to companies associated with the applications 68, 69, as further described below.

The control modules 36, 60 may communicate with control modules 90, 92 of a service station 94 of a service company and an insurance station 96 of an insurance company. The service and insurance stations referred to below may refer to the stations 94, 96.

Figure 2:
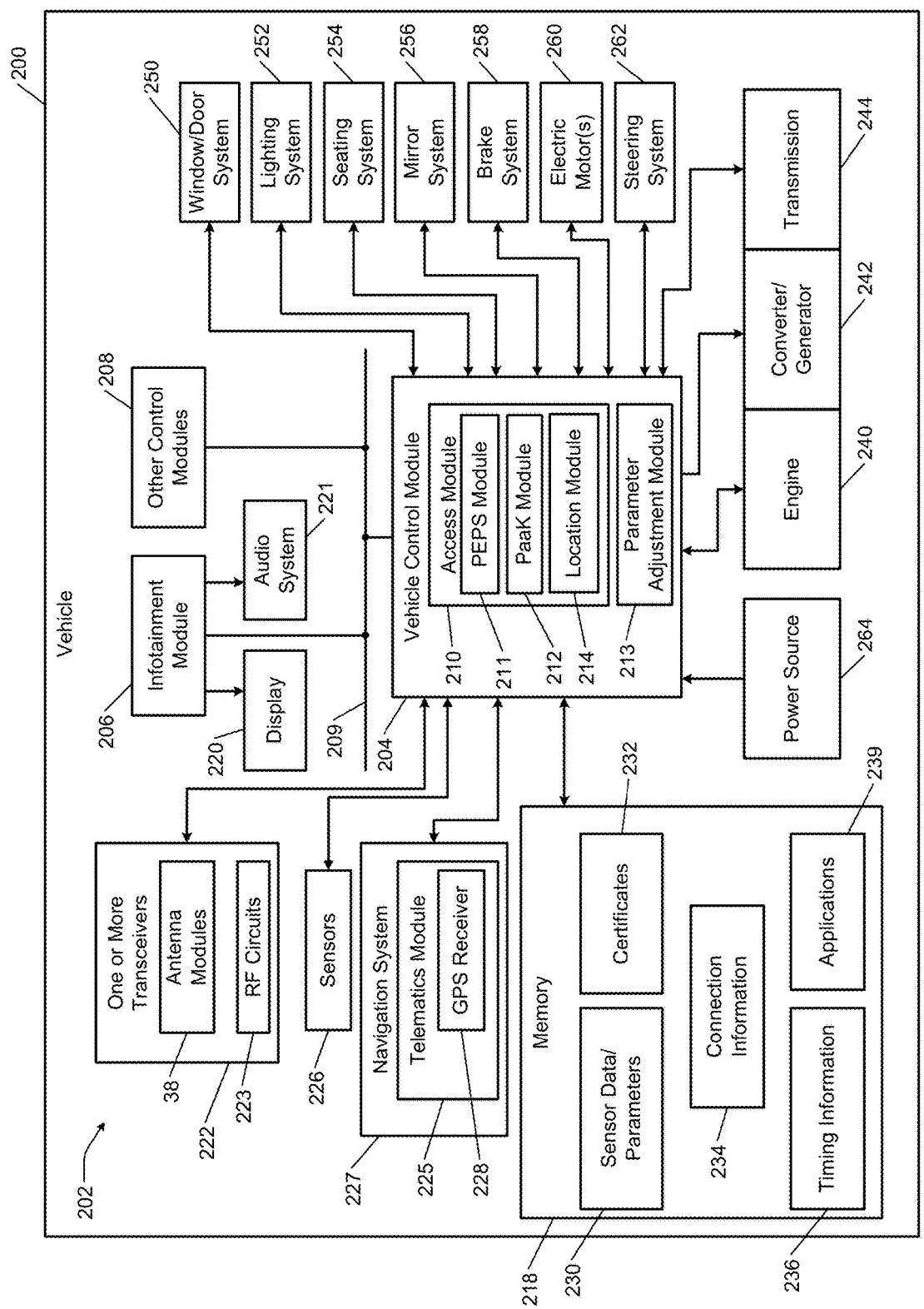
FIG. 2 is a functional block diagram of an example of a vehicle including an access module in accordance with the present disclosure.
Figure 3:
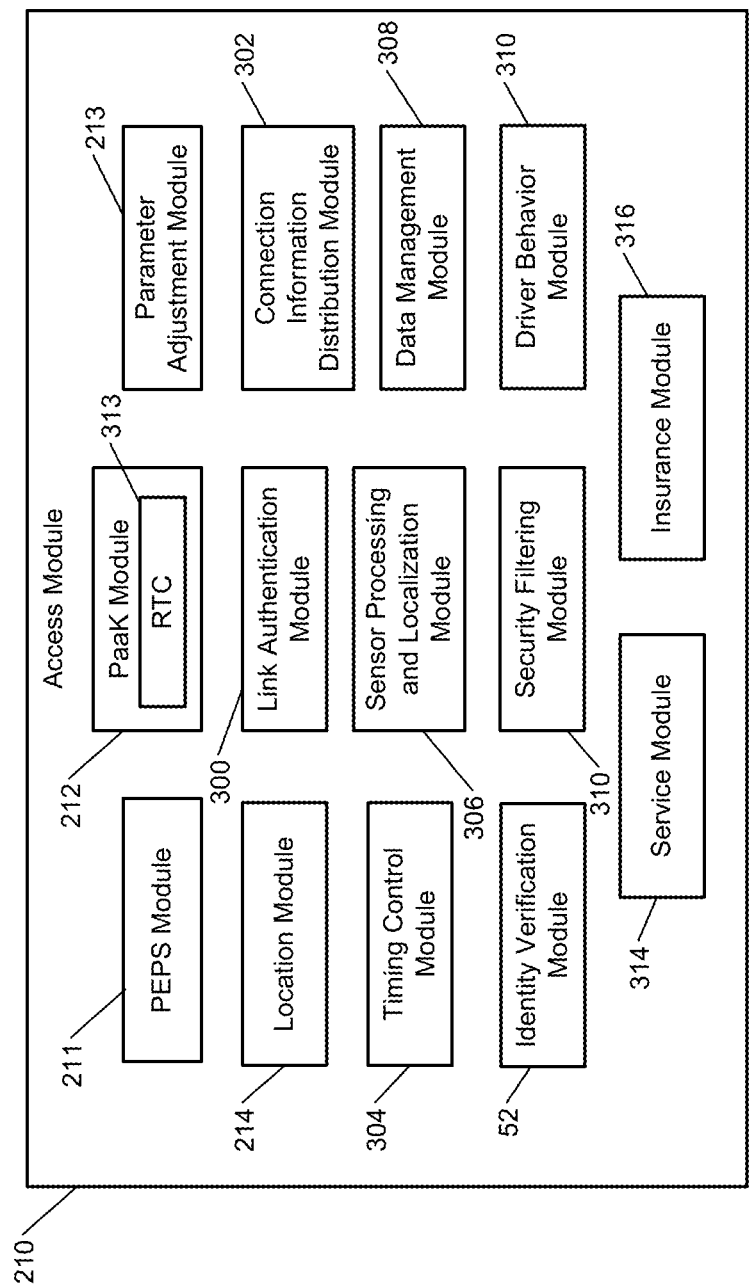
FIG. 3 is a functional block diagram of an example of the access module of FIG. 2 in accordance with the present disclosure.

FIG. 2 shows a vehicle 200 that is an example of the vehicle 30 of FIG. 1. The vehicle 200 includes a PaaK system 202, which includes a vehicle control module 204 (e.g., the control module 36 of FIG. 1), an infotainment module 206 and other control modules 208 (e.g., a body control module). The modules 204, 206, 208 may communicate with each other via a bus 209 and/or other vehicle interface (e.g., the vehicle interface 45 of FIG. 1). As an example, the bus 209 may include a controller area network (CAN) bus, a local interconnect network (LIN) for lower data-rate communication, a clock extension peripheral interface (CXPI) bus and/or one or more other vehicle interfaces. The vehicle control module 204 may control operation of vehicles systems. The vehicle control module 204 may include an access module 210, a PEPS module 211, a PaaK module 212 a parameter adjustment module 213 and a location module 214, as well as other modules, some of which are shown in FIG. 3. FIG. 2 is an example of when an access module (e.g., the access module 210) is implemented as a separate module from the antenna modules 38 and transceivers 222. The transceivers 222 include BLE and UWB transceivers.

The vehicle control module 204 may also include one or more processors that are configured to execute instructions stored in a non-transitory computer-readable medium, such as the memory 218, which may include read-only memory (ROM) and/or random access memory (RAM).

The PEPS module 211 may perform PEPS operations to provide access to an interior of the vehicle and permit starting and/or operation of the vehicle. Starting the vehicle may refer to powering ON devices of the vehicle, starting an internal combustion engine, starting a motor of the vehicle, and/or starting other operations of the vehicle. The PaaK module 212 operates in cooperation with the PEPS module 211 and performs PaaK operations as described herein. The PEPS module 211 may include the PaaK module 212 or the modules 211, 212 may be implemented as a single module. The parameter adjustment module 213 may be used to adjust parameters of the vehicle 200. The location module 214 may generate location signals, which may be transmitted to mobile access devices for location determinations, as further described below.

The PaaK system 202 may further include: a memory 218; a display 220; an audio system 221; and one or more transceivers 222 including the antenna modules 38. The antenna modules 38 may include and/or be connected to RF circuits 223. The PaaK system 202 may further include: a telematics module 225; sensors 226; and a navigation system 227 including a global positioning system (GPS) receiver 228. The RF circuits 223 may be used to communicate with a mobile device (e.g., the mobile access device 34 of FIG. 1) including transmission of Bluetooth® signals at 2.4 giga-Hertz (GHz) and UWB signals. The RF circuits 223 may include BLE radios, transmitters, receivers, etc. for transmitting and receiving RF signals.

The one or more transceivers 222 may include a RF transceiver including the RF circuits 223 and implement an access application having code to inspect timestamped data received and transmitted by the antenna modules 38. The access application may confirm whether the antenna modules 38 have, for example, received correct data at the correct time. The access application may be stored in the memory 218 and implemented by the PEPS module 211 and/or the PaaK module 212. Other example operations of the access application are further described below.

The access application may implement a Bluetooth® protocol stack that is configured to provide a channel map, access identifier, next channel, and a time for a next channel. The access application is configured to output timing signals for timestamps for signals transmitted and received via the antenna modules 38. The access application may obtain channel map information and timing information and share this information with other modules in the vehicle.

The telematics module 225 may communicate with a server via a cell tower station. This may include the transfer of certificates, license information, and/or timing information including global clock timing information. The telematics module 225 is configured to generate location information and/or error of location information associated with the vehicle 200. The telematics module 225 may be implemented by a navigation system 227.

The sensors 226 may include sensors used for PEPS and PaaK operations, cameras, objection detection sensors, temperature sensors, accelerometers, vehicle velocity sensor, and/or other sensors. The sensors 226 may include a touch sensor to detect, for example, a person touching a door handle to initiate a process of waking up a mobile access device. In one embodiment, interior cameras are used to determine the locations of mobile access devices and facing directions of the mobile access devices. For example, a mobile access device may be located on a center console of a vehicle and facing a driver or a passenger of the vehicle. When facing the driver, the mobile access device is likely being used by the driver. The access module 210 may review the images and determine the locations of the mobile access devices based on objects (A-pillar, B-pillar, C-pillar, seats, center console, steering wheel, dashboard, glove box, doors, windows, etc.) in the images.

The sensors 226 may be connected to the other control modules 208, such as the body control module, which may be in communication with LF and RF antenna circuits and/or modules disclosed herein. The GPS receiver 228 may provide vehicle velocity and/or direction (or heading) of the vehicle and/or global clock timing information.

The memory 218 may store sensor data and/or parameters 230, certificates 232, connection information 234, timing information 236, and applications 239. The applications 239 may include applications executed by the modules 38, 204, 206, 208, 210, 211, 212, 214, 223 and/or transceivers 222. As an example, the applications may include the access application, a PEPS application and/or a PaaK application executed by the transceivers 222 and the modules 210, 211, 212 and/or 214. Although the memory 218 and the vehicle control module 204 are shown as separate devices, the memory 218 and the vehicle control module 204 may be implemented as a single device. The single device may include one or more other devices shown in FIG. 1.

The vehicle control module 204 may control operation of an engine 240, a converter/generator 242, a transmission 244, a window/door system 250, a lighting system 252, a seating system 254, a mirror system 256, a brake system 258, electric motors 260 and/or a steering system 262 according to parameters set by the modules 204, 206, 208, 210, 211, 212, 213, 214. The vehicle control module 204 may perform PEPS and/or PaaK operations, which may include setting some of the parameters. The PEPS and PaaK operations may be based on signals received from the sensors 226 and/or transceivers 222. The vehicle control module 204 may receive power from a power source 264, which may be provided to the engine 240, the converter/generator 242, the transmission 244, the window/door system 250, the lighting system 252, the seating system 254, the mirror system 256, the brake system 258, the electric motors 260 and/or the steering system 262, etc. Some of the PEPS and PaaK operations may include unlocking doors of the window/door system 250, enabling fuel and spark of the engine 240, starting the electric motors 260, powering any of the systems 250, 252, 254, 256, 258, 262, and/or performing other operations as are further described herein.

The engine 240, the converter/generator 242, the transmission 244, the window/door system 250, the lighting system 252, the seating system 254, the mirror system 256, the brake system 258, the electric motors 260 and/or the steering system 262 may include actuators controlled by the vehicle control module 204 to, for example, adjust fuel, spark, air flow, steering wheel angle, throttle position, pedal position, door locks, window position, seat angles, etc. This control may be based on the outputs of the sensors 226, the navigation system 227, the GPS 228 and the above-stated data and information stored in the memory 218.

Referring now also to FIG. 3, which shows the access module 210. The access module 210 includes the PEPS module 211, the PaaK module 212, the parameter adjustment module 213, the location module 214 and may further include a link authentication module 300, a connection information distribution module 302, a timing control module 304, a sensor processing and localization module 306, a data management module 308, a security-filtering module 310, the identity verification module 52, a driving behavior module 312, a service module 314 and an insurance module 316. The PaaK module 212 may include a real time clock (RTC) 313 that maintains a local clock time. In one embodiment, one or more of the modules 52, 214, 312, 314, and 316 are implemented as part of the PaaK module 212.

The link authentication module 300 may authenticate the mobile access devices of FIG. 1 and establish the secure communication link. For example, the link authentication module 300 can be configured to implement challenge-response authentication or other cryptographic verification algorithms in order to authenticate the mobile access devices.

The connection information distribution module 302 is configured to communicate with some of the sensors 226 of FIG. 2 and provide the sensors with communication information necessary for the sensors to find and then follow, or eavesdrop on, the secure communication link. This may occur once the sensors are synchronized with a communication gateway, which may be included in or implemented by one of the transceivers 222. As an example, the vehicle 200 and/or the PaaK system 202 may include any number of sensors disposed anywhere on the vehicle 200 for detecting and monitoring mobile devices. The connection information distribution module 302 is configured to obtain information corresponding to communication channels and channel switching parameters of a communication link and transmit the information to the sensors 226. In response to the sensors 226 receiving the information from the connection information distribution module 302 via a bus or other vehicle interface disclosed herein and the sensors 226 being synchronized with the communication gateway, the sensors 226 may locate and follow, or eavesdrop on, the communication link.

The timing control module 304 may: maintain the RTC and/or currently stored date if not handled by the PaaK module 212; disseminate current timing information with the sensors; generate timestamps for incoming and outgoing messages, requests, signals, certificates, and/or other items; calculate round trip times; etc. A round trip time may refer to the amount between when a request is generated and/or transmitted and a time when a response to the request is received. The timing control module 304 may obtain timing information corresponding to a communication link when the link authentication module 300 executes challenge-response authentication. The timing control module 304 is also configured to provide the timing information to the sensors 226 via the bus (or vehicle interface) 209.

After link authentication is established, the data management module 308 collects the current location of the vehicle 200 from the telematics module 225. The location module 214 determines locations of the mobile access devices relative to the vehicle 200. This may include performing an exchange of UWB challenge signals to determine distances between reference points within the vehicle 200 and the mobile access devices. Based on the determined locations of the mobile access devices, the mobile access devices can wait determined periods of time, prior to performing a subsequent exchange of UWB signals (referred to as a set of range request/response signals) to determine updated locations of the mobile access devices.

The security-filtering module 310 detects violations of a physical layer and protocol and filter data accordingly before providing information to the sensor processing and localization module 306. The security-filtering module 310 flags data as injected such that the sensor processing and localization module 306 is able to discard data and alert the PEPS module 211. The data from the sensor processing and localization module 306 is passed along to the PEPS module 211, whereby the PEPS module 211 is configured to read vehicle state information from the sensors in order to detect user intent to access a feature and to compare a location of a mobile device to a set of locations that authorize certain vehicle features, such as unlocking a door or trunk of the vehicle and/or starting the vehicle.

The driving behavior module 312 may tracking driving behavior and driving events, such as quick accelerations, speeding, not stopping at stop signs, heavy braking, tailgating, and/or other poor driving behaviors. The driving behavior module 312 may also track good driving behavior. The driving behavior module 312 may report this information to (i) the mobile access device of the driver, (ii) a service company that the driver is working for while driving the vehicle, and/or (iii) a vehicle insurance company providing insurance for the driver and/or vehicle. The service company may provide, for example, passenger and/or package delivery services.

The service module 314 may be associated with a service application implemented on a mobile access device of a driver of the vehicle. The service application may be implemented on the mobile access device and used while the driver is working and transporting passengers and/or packages. The service module 314 may collect and transfer the driving behavior information to the service application and/or other vehicle and/or passenger information collected from the vehicle.

The insurance module 316 may be associated with an insurance company and/or an insurance application implemented on a mobile access device of a driver of the vehicle. The insurance application may be used while the driver (or first driver) is driving the vehicle and while the first driver is not driving the vehicle to detect vehicle operation when another (or second) driver is driving the vehicle. The second driver may or may not be covered by the insurance contract of the first driver. The insurance module 316 may collect and transfer the driving behavior information and/or other vehicle information collected from the vehicle to the insurance station of insurance provider.

Figure 4:
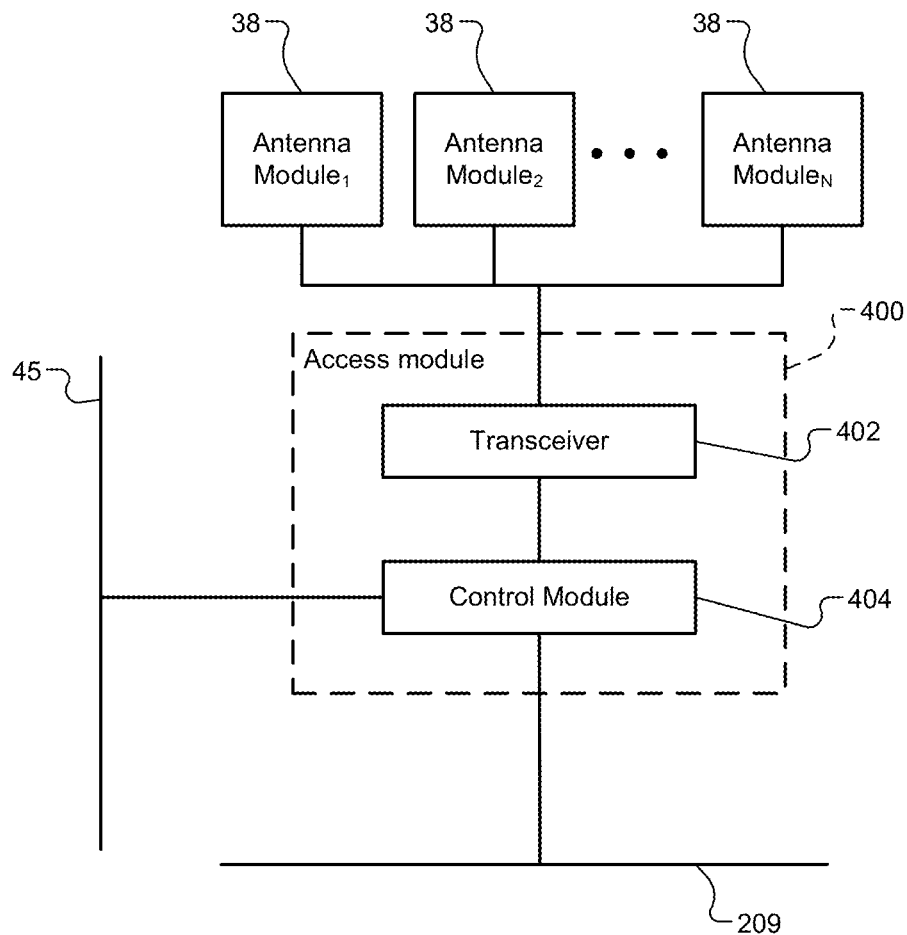
FIG. 4 is a functional block diagram of an example of antenna modules and the access module of FIG. 1.

FIG. 4 is an example of an access module 400, such as the access module 210 of FIG. 2. The access module 400 may include or be connected to one or more of the antenna modules 38 of FIG. 1. The access module 400 may include or be connected to a transceiver 402 and a control module 404. The control module 404 may be implemented similarly as the control modules 36, 204 of FIGS. 1 and 2. The transceiver 402 may be configured to transmit and/or receive RF, BLE and/or UWB signals. The control module 404 may include or be part of a BLE communication chipset and/or include or be part of a Wi-Fi or Wi-Fi direct communication chipset. Some or all of the operations of the control module 404 may be implemented by one or more of the modules 204, 210, 211, 212, 214 of FIG. 2.

The control module 404 (or one or more of the modules 204, 210, 211, 212 of FIG. 2) may establish a secure communication connection with a mobile access device. For example, the control module 404 may establish a secure communication connection using the BLE communication protocol this may include transmitting and/or receiving timing and synchronization information. The timing and synchronization information may include information directed to the secure communication connection, such as timing of next communication connection events, timing intervals between communication connection events, communication channels for next communication connection events, a channel map, a channel hop interval or offset, communication latency information, communication jitter information, etc. The control module 404 may detect (or "eavesdrop") packets sent by the mobile access device to the vehicle control module 204 and measure signal information of the signals received from the mobile access device. The channel hop interval or offset may be used to calculate a channel for a subsequent communication connection event.

The control module 404 may measure a received signal strength of a signal received from the mobile access device and generate a corresponding RSSI value. Additionally or alternatively, the control module 404 may take other measurements of transmitted and received signals from the mobile access device, such as an angle of arrival, a time of flight, a time of arrival, a time difference of arrival, etc. As an example, time of flight calculations may be made to measure time of flight of UWB signals to determine a location of the mobile access device. The control module 404 may then send the measured information to the vehicle control module 204, which may then determine a location of and/or distance to the mobile access device relative to the vehicle 30 of FIG. 1 based on the measured information. The location and distance determinations may be based on similar information received from one or more other antenna modules and/or other sensors.

As an example, the vehicle control module 204 may determine the location of the mobile access device based on, for example, the patterns of the RSSI values corresponding to signals received from the mobile access device by the antenna modules 38. A strong (or high) RSSI value indicates that the mobile access device is close to the vehicle 30 and a weak (or low) RSSI value indicates that the mobile access device is further away from the vehicle 30. By analyzing the RSSI values, the control module 204 may determine a location of and/or a distance to the mobile access device relative to the vehicle 30. Additionally or alternatively, angle of arrival, angle of departure, round trip timing, unmodulated carrier tone exchange, or time difference of arrival measurements for the signals sent between the mobile access device and the control module 204 may also be used by the control module 204 or the mobile access device to determine the location of the mobile access device. Additionally or alternatively, the antenna modules 38 may determine the location of and/or distance to the mobile access device based on the measured information and communicate the location or distance to the control module 204.

Based on the determined location of the mobile access device and/or distances between the mobile access device and reference points of the vehicle 30, the modules 211, 212 of FIG. 2 may then authorize and/or perform a vehicle function, such as unlocking a door of the vehicle 30, unlocking a trunk of the vehicle 30, starting the vehicle 30, and/or allowing the vehicle 30 to be started. As another example, if the mobile access device is less than a first predetermined distance from the vehicle 30, the modules 211, 212 may activate interior or exterior lights of the vehicle 30. If the mobile access device is less than a second predetermined distance from the vehicle 30, the modules 211, 212 may unlock doors or a trunk of the vehicle 30. If the mobile access device is located inside of the vehicle 30, the modules 211, 212 may allow the vehicle 30 to be started. Based on the determined location of and/or distances between the mobile access device and reference points, the modules 36, 50, 52, 60, 62, 64, 210, 211, 212, 214, 312, 314, 316, and 404 of FIGS. 1-4 may also perform certain operations as further described below.

Figure 5:
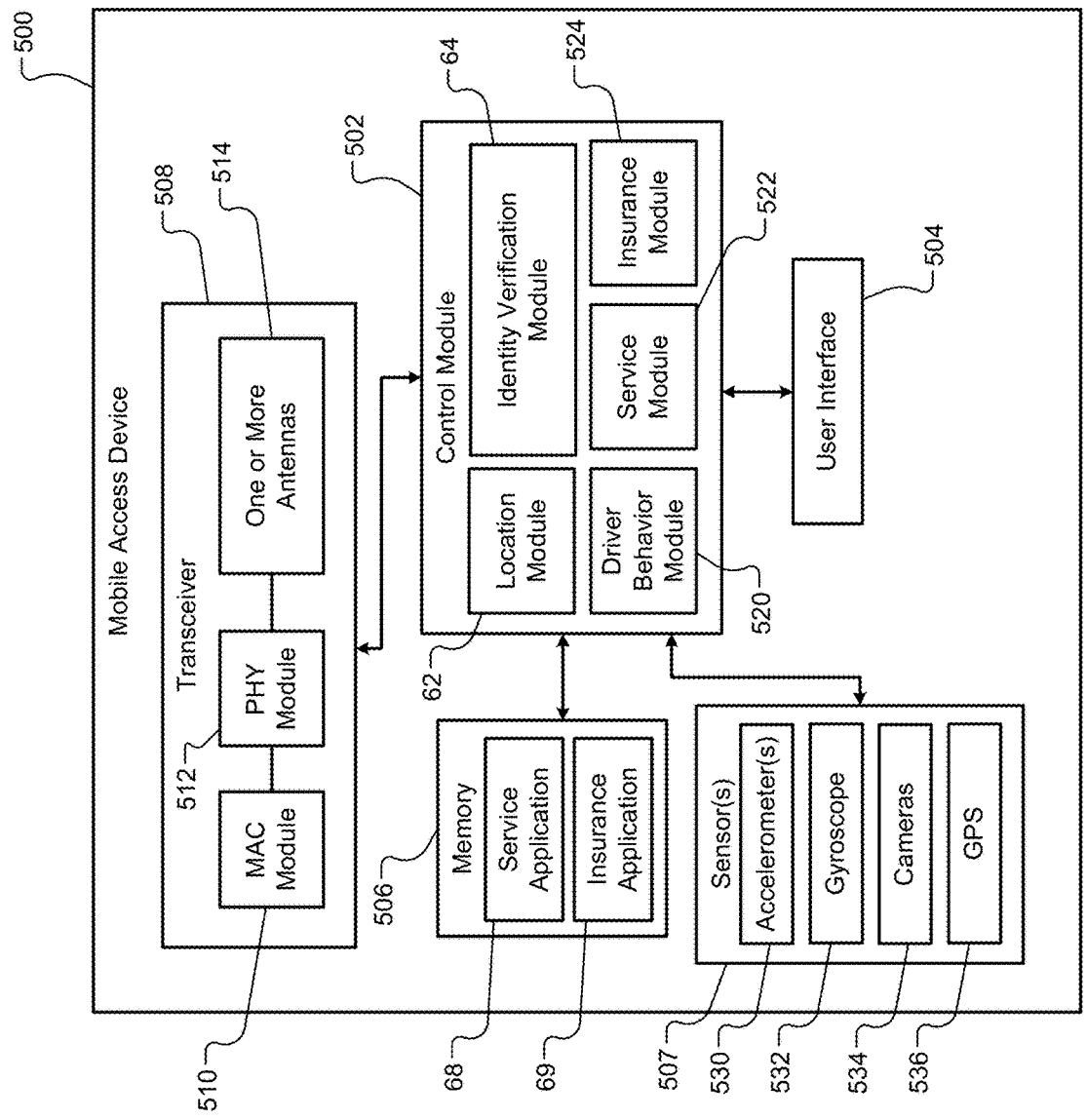
FIG. 5 is a functional block diagram of an example of a mobile access device including modules in accordance with the present disclosure.

FIG. 5 shows an example mobile (or portable) access device 500, which is an example of the mobile access device 34 of FIG. 1. The mobile access device 500 may include a control module 502, a user interface 504, a memory 506, sensors 507 and a transceiver 508. The transceiver 508 may include a MAC module 510, a PHY module 512 and one or more antennas 514.

The control module 502 may include or be part of a BLE and/or UWB communication chipset. Alternatively, the control module 502 may include or be part of a Wi-Fi or Wi-Fi direct communication chipset. The memory 506 may store application code that is executable by the control module 502. For example, the memory 506 may store the service application 68 and the insurance application 69. The memory 506 may be a non-transitory computer-readable medium including read-only memory (ROM) and/or random-access memory (RAM).

The control module 502 may include a location module 62 (also shown in FIG. 1) and communicate with the control module 36 of the vehicle 30 and determines a location of the mobile access device 500. The location module 62 may perform UWB signal exchanges with the antenna modules 38 and/or location module 50 of FIG. 1 to allow the vehicle 30 to determine a location of the mobile access device 500, which may be reported to the mobile access device 500. Single sided ranging, double sided ranging, time-of-flight determining, round trip time determining, etc. may be performed to determine distances between mobile access device 500 and reference points on the vehicle 30.

The control module 502 may further include the identity verification module 64, a driver behavior module 520, a service module 522 and an insurance module 524. The driver behavior module 520 tracks driving behavior of the user of the mobile access device 500. The service module 522 may execute the service application 68. The insurance module 524 may execute the insurance application 69. The service module 522 may indicate service related information to the user, such as pickup and drop off times and locations, pickup and delivery times and locations, charge rates for transfer and/or delivery, premium rates for certain locations, waiting (non-driving) rates, etc. The service module 522 may also indicate instructions based on driving behavior tracked and/or evaluated by the service application 68 and/or transmitted to the mobile access device by a service station of a service company. For example, the service application 68 may report driving behavior to the service station and the service station may respond by sending instructions to the mobile access device 500 for the user. The instructions may include instructions to maintain or alter current driving behavior, instructions to return the vehicle to the service company, and/or other instructions, some of which are disclosed below.

The insurance module 524 may indicate insurance related information to the user, such as insurance rates based on tracked driving behavior, rates if driving behavior improves, rates if driving behavior worsens, tips to improve driving behavior, etc. The insurance module 524 may also indicate instructions based on driving behavior tracked and/or evaluated by the insurance application 69 and/or transmitted to the mobile access device by an insurance station of insurance company. For example, the insurance application 69 may report driving behavior to the insurance station and the insurance station may respond by sending instructions to the mobile access device 500 for the user. The instructions may include instructions to maintain or alter current driving behavior and/or other instructions, some of which are disclosed below The control module 502 may transmit information regarding the mobile access device 500, such as location, heading and/or velocity information obtained from one or more of the sensors 507 (e.g., a global navigation satellite system (e.g., GPS) sensor, an accelerometer, a gyroscope, and/or an angular rate sensor). In the example shown, the sensors 507 include one or more accelerometers 530, a gyroscope 532, cameras 534, and/or GPS 536. In another embodiment, the gyroscope 532 is not utilized. The user interface 504 may include a key pad, a touch screen, a voice activated interface, and/or other user interface.

Although the following methods of FIGS. 6-12 are shown as separate methods, one or more of the methods and/or operations from separate methods may be combined and performed as a single method. Although the operations of these methods are primarily described with respect to the implementations of FIGS. 1-5, the operations may be easily modified to apply to other implementations of the present disclosure. The operations may be iteratively performed.

Figure 6:
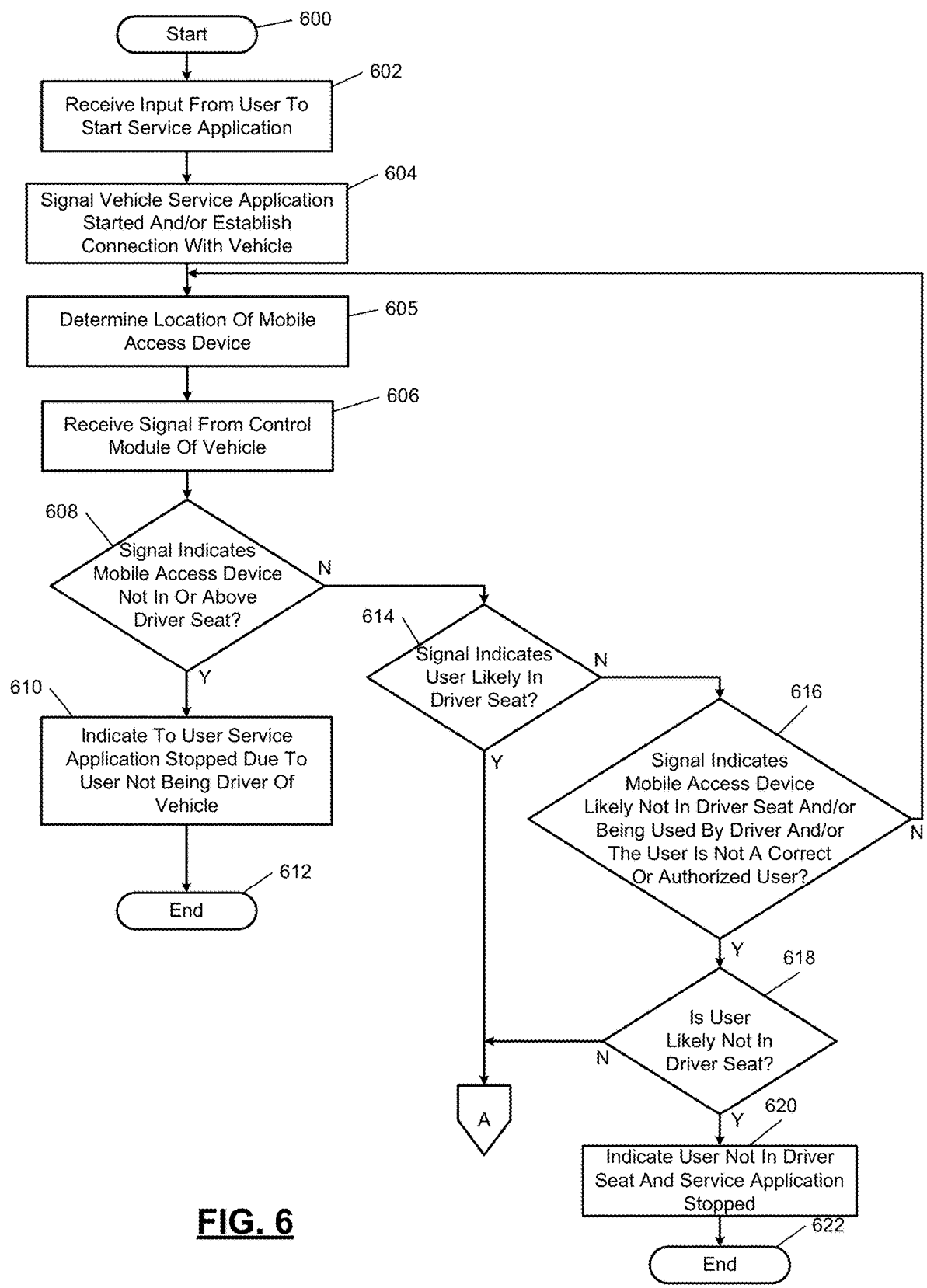
FIG. 6 illustrates a method of operating a mobile access device in accordance with the present disclosure.

FIG. 6 shows a method of operating a mobile access device (e.g., one of the mobile access devices 34, 500 of FIGS. 1 and 5). The method may begin at 600. At 602, the control module 60 (or 502) may receive an input from a user of the mobile access device 500 to start the service application 68, which may be started, for example, when the vehicle 30 (or 200) is being used to provide a service. For example, at a certain time of day, the user transitions from using the vehicle for everyday personal functions, such as commuting, and begins using the vehicle for services and turns on the service application.

At 604, the control module 60 may signal the control module 36 (or 204) that the service application 68 has been or is about to be started. The control module 60 may also establish a connection with the control module 36 if not already established. This may include exchange of Bluetooth® low-energy (BLE) messages to ensure a connection with a vehicle. The BLE messages may include an advertisement sent from the mobile access device 34 and response received from the vehicle. An advertisement period at which BLE messages are transmitted can be set to ensure that the mobile access device 34 remains connected.

At 605, the location module 62 may determine the location of the mobile access device 34 and report the location to the location module 50. This may be based on GPS location information from the GPS 536 and/or captured images via the cameras 534. The information received from the GPS 536 and/or the cameras and/or information determined based thereon may be sent to the location module 62. The location module 62 may determine the location of the mobile access device 34 in the vehicle based on objects seen in the captured images using for example image recognition processes. Location information determined by the location module 50 of the vehicle may be shared with the location module 62. The location information may be based on, for example, (i) pillar angles, (ii) seat belt angles, (iii) whether pedals are forward of the user and/or near user's feet, (iv) location of the mobile access device 34 relative to a steering wheel, (v) head restraints (or head rests), etc. Cameras may be used as a backup to verify other location information. The location may be determined based on which door the mobile access device passed through upon entering the vehicle. For example, if the mobile access device passed through a front passenger door, then the mobile access device is likely being used by the front passenger, not the driver. The location module 62 may monitor the location of the mobile access device relative to the vehicle once the mobile access device is within a predetermined range of the vehicle. In one embodiment, the service application 68 when executed causes images of a surrounding to be captured and then the location module 62 and/or service module 522 determines the location based on the images.

At 606, the control module 60 receives a signal from the control module 36. At 608, the control module 60 determines whether the received signal indicates that the mobile access device 34 is not in (or above) the driver seat 70. If the signal indicates that the mobile access device 34 is not in the driver seat 70, operation 610 may be performed, otherwise operation 614 may be performed. At 610, the location module 62 may indicate to the user of the mobile access device 34, via the user interface 504, that the mobile access device 34 is not in vicinity of the driver seat 70 and/or being used by a driver of the vehicle and for this reason execution of the service application 68 is stopped. The method may end at 612 subsequent to performing operation 610.

At 614, the location module 62 determines whether the received signal indicates that the mobile access device 34 is likely in the driver seat. If true, the identity verification process may be executed including performing operation 800. If the received signal does not indicate that the mobile access device is likely in the driver seat, operation 616 may be performed.

At 616, the location module 62 determines whether the received signal indicates that (i) the mobile access device 34 is likely not in the driver seat and/or being used by driver, (ii) the user is likely not the correct user of the service application 68, and/or (iii) the user is likely not authorized to use the service application. If true, operation 618 may be performed, otherwise operation 606 may be performed.

At 618, the location module 62 determines whether the user of the mobile access device is likely not in the driver seat 70. If true, operation 620 may be performed, otherwise operation 800 may be performed. At 620, the location module 62 indicates that the user is not in the driver seat and the service application is stopped. The method may end at 622 subsequent to performing operation 620.

Figure 7:
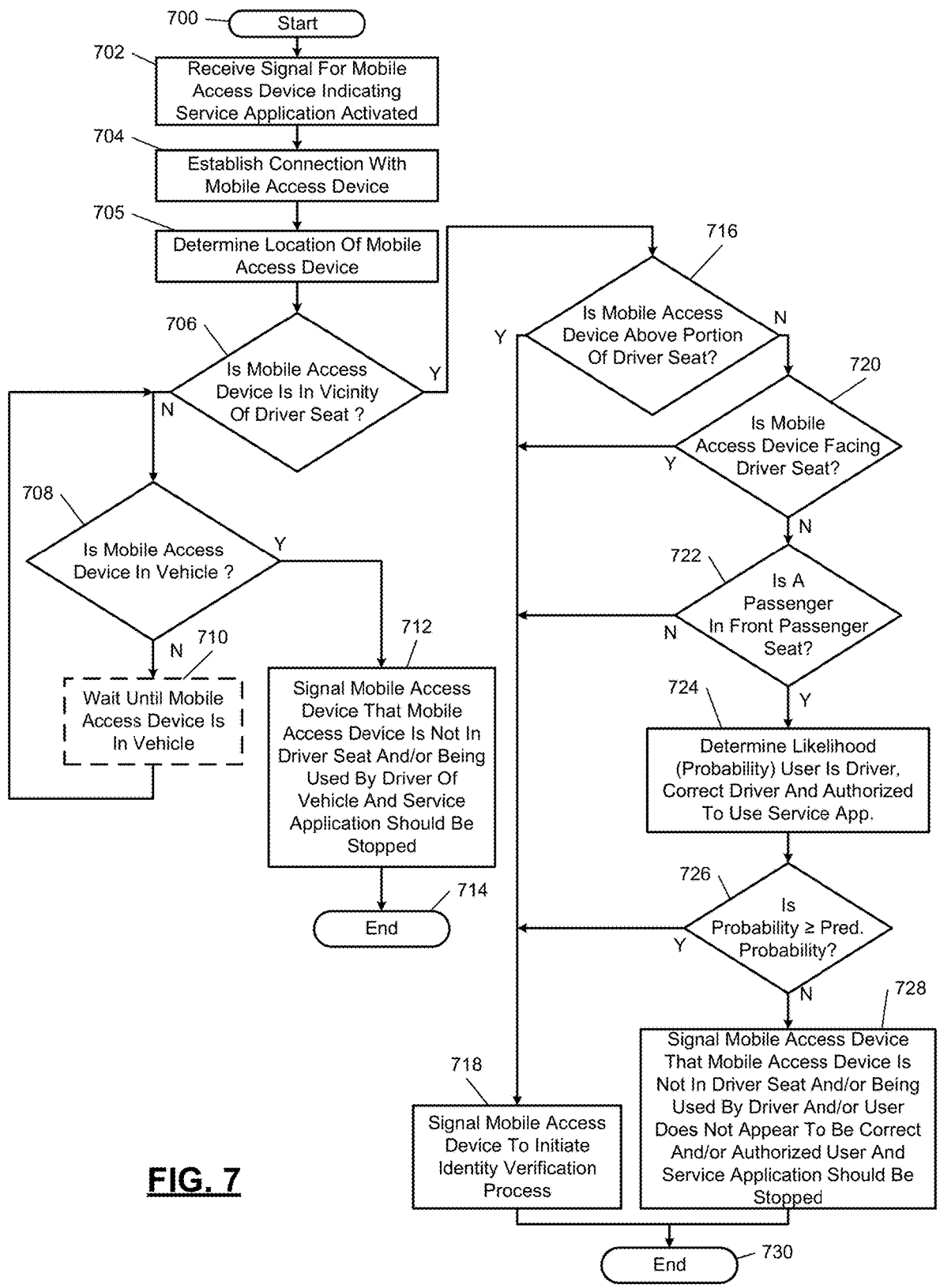
FIG. 7 illustrates a method of operating a control module of a vehicle in accordance with the present disclosure.

FIG. 7 shows a method of operating the control module 36 (or control module 204) of the vehicle 30. The method may begin at 700. At 702, the control module 36 may receive the signal transmitted from the mobile access device indicating that the service application 68 has or is about to be started and may establish a connection with the mobile access device 34 (or 500) at 704. This may be done if a connection has not already been established.

At 705, the location module 50 may determine the location of the mobile access device 34 as described above. This may be based on information received from the location module 62. UWB signals may be transmitted and/or exchanged to obtain the location information. Cameras may be operated to capture images surrounding the mobile access device to determine the location. This may include determining if the user holding the phone is in the driver seat 70. The location information may be based on, for example, (i) pillar angles, (ii) seat belt angles, (iii) whether pedals are forward of the user, (iv) location of the mobile access device 34 relative to a steering wheel and/or head restraints (or head rests), etc. Cameras may be used as a backup to verify other location information using for example image recognition processes. The location may be determined based on which door the mobile access device passed through upon entering the vehicle 30. The location module 50 may monitor movement of the mobile access device, once the mobile access device is within a predetermined range of the vehicle 30.

At 706, the location module 50 determines whether the mobile access device 34 is in a vicinity of the driver seat 70 as described above. This may include determining if the mobile access device 34 is on, above or within one or more predetermined distances, of the driver seat 70. The location may be determined as described above. In one embodiment, UWB signals are transmitted and/or exchanged to determine the precise location of the mobile access device 34. If the mobile access device 34 is not in the vicinity of the driver seat 70, operation 708 may be performed, otherwise operation 716 may be performed.

At 708, the location module 50 determines whether the mobile access device 34 is in the vehicle 30. If the mobile access device 34 is not in the vehicle 30, operation 710 may be performed, otherwise operation 712 may be performed. At 710, the location module may wait until the mobile access device 34 is in the vehicle 30 prior to returning to operation 708.

At 712, the location module 50 signal the mobile access device 34 that the mobile access device 34 is not in vicinity of the driver seat 70 and/or being used by a driver of the vehicle 30 and for this reason execution of the service application should be stopped. The method may end at 714 subsequent to performing operation 712.

At 716, the location module 50 determines whether the mobile access device 716 is above a portion of the driver seat 70. If the location module 50 is above a portion of the driver seat 70, operation 718 may be performed, otherwise operation 720 may be performed.

At 718, the location module 50 may signal the mobile access device 34 indicating that the mobile access device 34 is likely above the driver seat 70 and to initiate the identity verification process.

At 720, the location module 50 determines whether the mobile access device 34 is facing the driver seat 70. If the mobile access device 34 is facing the driver seat 70, then the user of the mobile access device 34 is likely the driver. This may be done based on images captured by the mobile access device 34 and transmitted to the location module 50 and/or images captured by the sensors 226 of the vehicle 30. In one embodiment, the location module 50 request images from the location module 62 of the mobile access device 34 and the location module 62 captures images via the cameras 534.

At 722, the location module 50 and/or other module of the vehicle determines whether there is a passenger in the front passenger seat 80. This may be done using the sensors 226. The sensors 226 may include cameras, one or more strain gauges mounted in the seat 80, a piezo resistive sensor mounted in the seat 80, and/or other sensors for detecting presence of a passenger. Signals from the sensors 226 may be monitored by the location module 50. If a passenger is in the front passenger seat 80, then the passenger may be utilizing the mobile access device 34, which may be sitting, for example, on the center console 74. If a passenger is in the passenger seat 80, then operation 724 may be performed, otherwise operation 718 may be performed.

At 724, the location module 50 may determine the likelihood (or probability) that the user is the driver of the vehicle, is the correct driver (or user) for the service application 68 on the mobile access device, and is authorized to use the service application 68. This may be based on previous location information collected and include, for example, signaling the mobile access device 34 to ask the user one or more questions via a user interface in the vehicle, such as the display 220 and/or the audio system 221. Location of the user may be determined based on audio input received by the audio system 221. The questions may be provided to the mobile access device 34 and displayed on the user interface 504. Responses received from the mobile access device 34 are returned to the location module 50.

The location module 50 or other module may compare vehicle settings set by the driver of the vehicle to typical vehicle settings stored for the authorized user and if there is a match, then the probability that the user is the authorized user is high. The vehicle settings may include driver seat position and/or settings, steering wheel settings, seat belt extended length, climate control settings, mirror settings, media settings, radio station settings, etc. The location module 50 or other module may compare driver characteristics to characteristics stored for the authorized user, such as height, weight, eye color, body peripheral pattern, etc. If the characteristics of the driver match the characteristics of the authorized user, then the probability that the user is the authorized user is high. The location module 50 or other module may compare driving behavior of the current driver with stored typical driving behavior of the authorized user and if there is a match, then the likelihood that the user is the authorized user is high. If there is not a complete match or only a match with some of the vehicle settings, driver characteristics, and/or driving behavior, then the probability of the user being the authorized user is less.

At 726, the location module may determine whether the probability is higher than a predetermined probability based on the comparisons performed at 724. If the probability is greater than the predetermined probability, then operation 718 is performed, otherwise operation 728 is performed.

At 728, the location module 50 signals the mobile access device 34 indicating that (i) the mobile access device 34 is likely not in the driver seat and/or being used by the driver, (ii) the user is likely not the correct user, and/or (iii) the user is not an authorized user to implement the service application 68 and service application should be stopped. The method may end at 730 subsequent to performing operations 718 and 728.

Figure 8:
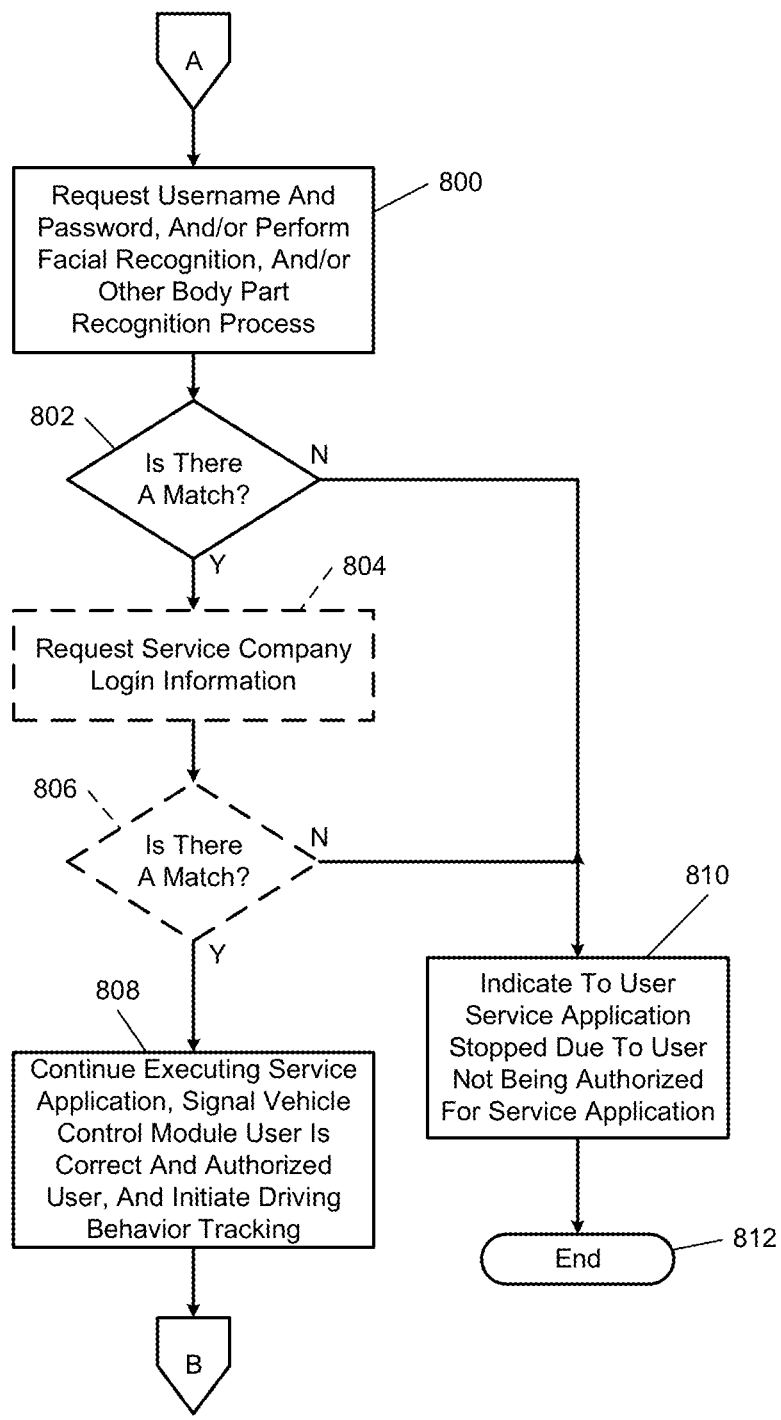
FIG. 8 illustrates an identification verification process implemented at a mobile access device in accordance with the present disclosure.

FIG. 8 shows an identification verification process implemented at the mobile access device 34 (or 500). Although this method is primarily described as being performed by the modules of the mobile access device 34, the method may be performed by modules of the vehicle, such as by the modules 52 and 204 of the vehicle. The method may begin at 800. At 802, the identity verification module 64 requesting and/or obtaining identity information from the user of the mobile access device 34, such as a username, a password, answers to predetermined questions, a key, facial recognition information, body part recognition information, etc. This information may be collected by capturing images of the user.

At 802, the identity verification module 64 may determine if the identity information collected at 800 matches stored identity information associated with an authorized user of the service application 68. The identity information may further include a name, address, account number and/or other personal information. As another example, facial features may be captured via one or more cameras of the vehicle and compared to stored facial features to determining if the driver is an authorized user. If there is a match, then operation 804 may be performed, otherwise operation 810 may be performed.

At 804, the identity verification module 64 and/or the service module 522 may request service company login information. This may be obtained from the user via the user interface 504 or from the memory 506. This may include a username, password, key, and/or other authentication information. The username, password and/or key may be different than that needed for a match at 802. At 806, the identity verification module 64 determines whether there is a match. This may include comparing an inputted username, password, and/or key with that stored in memory and/or the identity verification module transmitting the information collected at 804 to the service station of the service company and receiving a response back indicating whether the information is valid. If the information matches and/or is valid, operation 808 may be performed, otherwise operation 810 may be performed.

At 808, the service module 522 may continue executing the service application 68 and signal the control module 36 of the vehicle 30 that the user is correct and/or authorized and to initiate driving behavior tracking.

At 810, the identity verification module 64 and/or the service module 522 may indicate to the user that the service application 68 has been stopped due to the user not being authorized for the service application 68. The service module 522 may then stop executing the service application 68. The method may end at 812 subsequent to performing operation 810.

Figure 9:
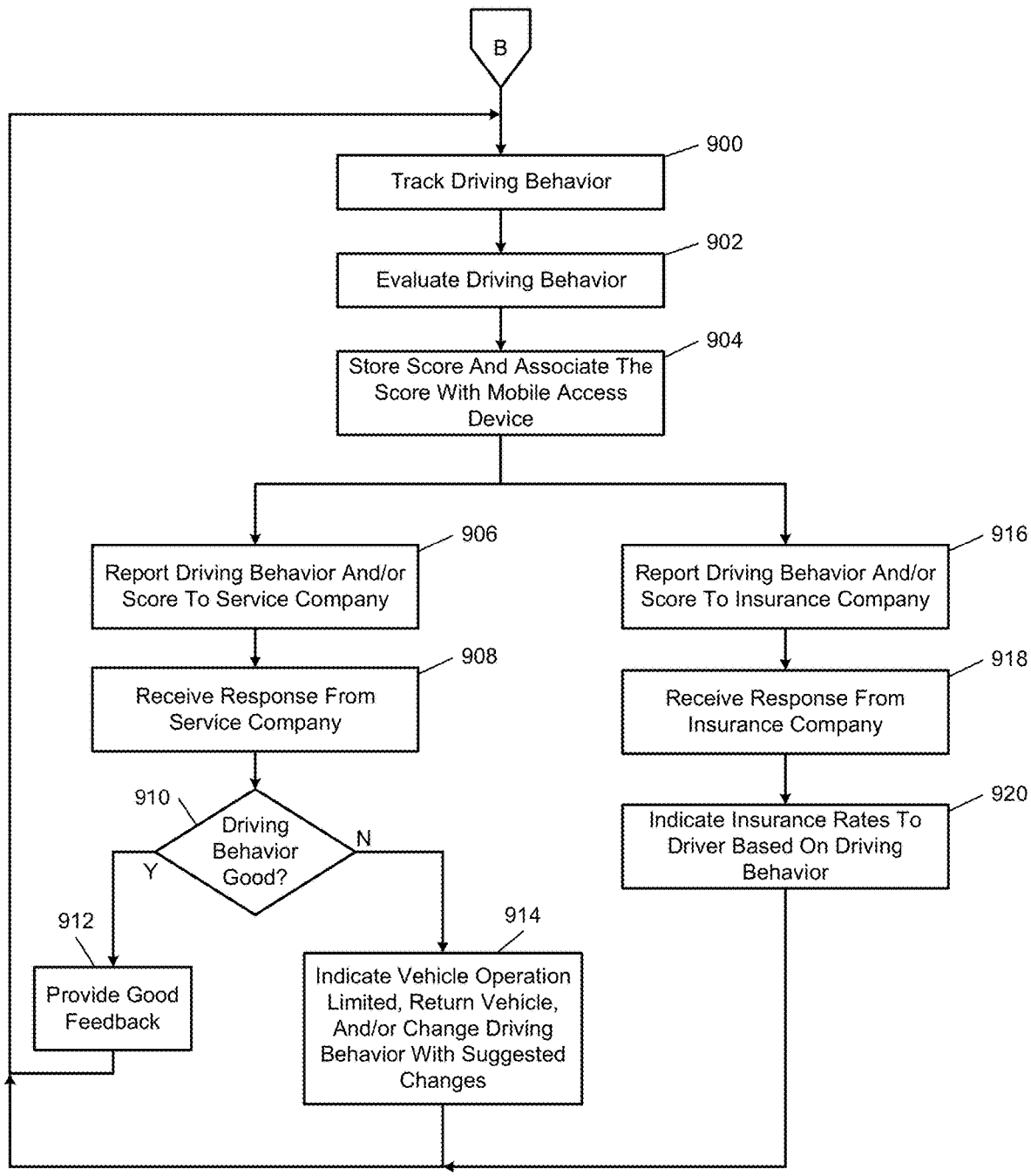
FIG. 9 illustrates a driving behavior method in accordance with the present disclosure.

FIG. 9 shows a driving behavior method, which may be implemented at the mobile access device 34 (or 500) and/or the vehicle 30 (or 200). This method may be implemented by modules 520, 522, 524 and/or modules 310, 314, 316. Operations 900, 902, 904 may be performed by modules 520, 310. Operations 906, 908, 910, 912, 914 may be performed by modules 522, 314. Operations 916, 918, 920 may be performed by modules 524, 316.

At 900, one or more of the driving behavior modules 520, 310 begin tracking driving behavior including acceleration and deceleration rates, turning speeds, distances between followed vehicles, etc. Driving behavior may be determined based on signals from the accelerometers 530, gyroscopes 532, and GPS 536 or based on signals from sensors 226 of the vehicle and reported to the mobile access device 34. The mobile access device may track driving behavior independent of the vehicle or based on information received from the vehicle.

At 902, one or more of the driving behavior modules 520, 310 may evaluate and/or score the driving behavior. In one embodiment, the tracked driving behavior information collected is sent to a remote station (e.g., a station of the service company of the service application 68 or a station of the insurance company of the insurance application 69). The remote station may then respond with a score. At 904, the score is stored and associated with the mobile access device 34 and the corresponding driver. A different score may be assigned to each mobile access device and driver combination (or pairing).

At 906, one or more of the service modules 522, 314 report the driving behavior and/or determined score to the station of the service company. At 908, the one or more of the service modules 522, 314 receive a response signal from the station. The response signal may indicate actions to be performed by the mobile access device 34 and/or the control module 36 of the vehicle 30.

At 910, one or more of the service modules 522, 314 determines whether the driving behavior is good (e.g., the score is greater than or equal to a predetermined score). If the driving behavior is good, operation 912 may be performed, otherwise operation 914 may be performed. At 912, one or more of the service modules 522, 314 may provide good feedback to the driver indicating to keep up the good driving behavior. At 914, one or more of the service modules 522, 314 may indicate to the driver (i) a warning to change driving behavior, (ii) vehicle operations are now limited, (iii) return vehicle to service company, and/or (iv) other information. The other information may indicate suggested changes, how vehicle operation has been limited (e.g., vehicle is limited to speeds below a predetermined speed). Operation 900 may be performed subsequent to operations 912, 914.

At 916, one or more of the insurance modules 524, 316 may report driving behavior and/or the determined score to a station of the insurance company. At 918, one or more of the insurance modules 524, 316 may receive a response signal from the station of the insurance company. The signal may indicate insurance rates based on current and/or past driving behavior, which may be indicated to the user at 920. The rates may be provided and based on a per user basis. The rates may be set based on a history and most recent driving behavior or may be based solely on most recent driving behavior. The rates may also be based on a credit score and/or number of infractions of the driver and/or other factors. The rates are based on who is driving the vehicle, which is determined during the methods of FIGS. 6-8.

As an example, the driver may be a very fast driver and often corners hard, which potentially increases rollover and accident risk. The control module 60 of the mobile access device 34 and the control module 36 (or PaaK system) may coordinate and compare collected data with vehicle data to confirm that the driver has been driving poorly and record each instance and send a report to the insurance company. The insurance company may then use this information to set insurance rates and/or perform other operations.

Operation 900 may be performed subsequent to operations 912, 914 and 920.

The above provided examples are applicable to in PEPS UWB/BLE systems. The above-described methods prevent an unauthorized user from being able to take and use a mobile access device of an authorized user and use a service application on the mobile access device. The above-described methods prevent a user of a mobile access device from accidently executing a service application when the user is not in the driver seat. The above-described methods also assure that the user of the service application is authorized to use the service application. This may include determining if the user is authorized to use the service application in the vehicle being driven. The service modules 522, 314 may communicate with each other and/or the control module 36 (or 204) and share information to determine if the service application 68 is associated with the vehicle being driven. This may include verifying, for example, an encrypted key provided by one of the modules 36, 314, 522 to and verified by another one of the modules 36, 314, 522.

Figure 10:
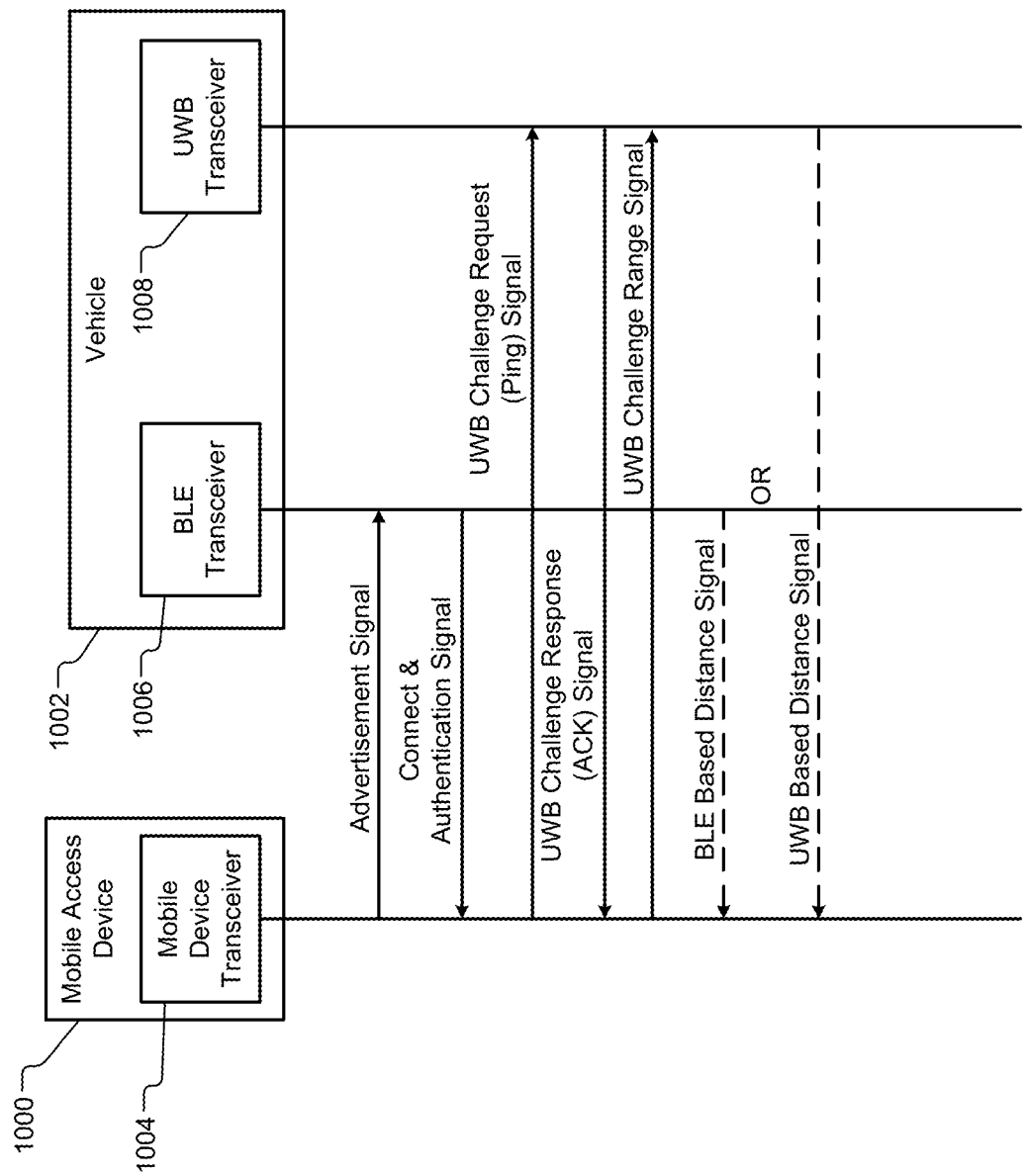
FIG. 10 is a signal timing diagram for determining a location of a mobile access device relative to a vehicle in accordance with the present disclosure.

FIG. 10 is a signal timing diagram for determining a location of a mobile (or portable) access device 1000 relative to a vehicle 1002, which may be similarly performed when the mobile access device 1000 is in and/or outside the vehicle 1002. This is applicable to the other vehicles and mobile access devices referred to herein. The mobile access device 1000 includes a mobile device transceiver 1004. The vehicle 1002 includes a BLE transceiver 1006 and a UWB transceiver 1008. The mobile access device 1000 and the vehicle 1002 may be configured and operate similarly as the mobile access devices and vehicles described above.

The mobile device transceiver 1004 transmits an advertisement signal according to a BLE protocol, which is received at the BLE transceiver 1006. The BLE transceiver 1006 responds with a connect signal and/or authentication signal. The mobile device transceiver 1004 then transmits a UWB change request signal (or ping signal) to the UWB transceiver 1008. The UWB transceiver 1008 responds with a UWB challenge response (or acknowledge (ACK)) signal. The mobile device transceiver 1004 then responds with a UWB challenge range signal.

An access module and/or location module of the vehicle may then determine distance between the mobile access device 1000 based on, for example, a time of flight (or round trip time) associated with transmitting the ACK signal and the UWB challenge range signal. The access module and/or location module may then transmit the distance to the mobile access device 1000 via the BLE transceiver 1006 or the UWB transceiver 708. A distance signal indicating the distance may be transmitted and include a sum, minimum, and/or maximum distance based on sensor data. The sensor data may include BLE, UWB and/or other sensor data.

Figure 11:
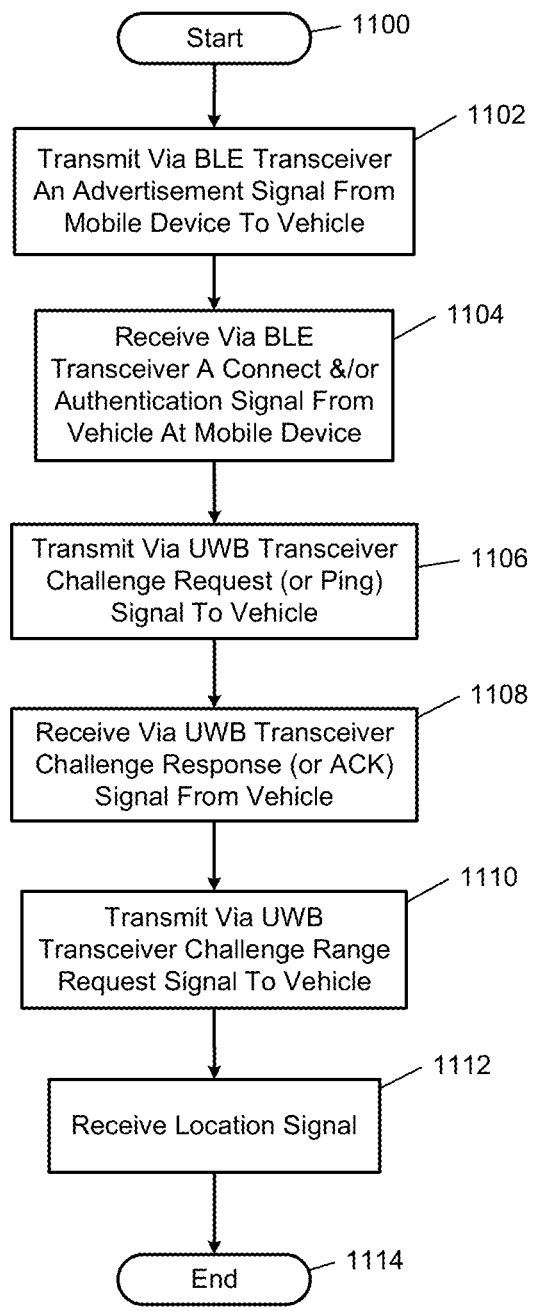
FIG. 11 illustrates a method of operating a mobile access device in accordance with the present disclosure.

FIG. 11 illustrates a method of operating a mobile access device, such as one of the mobile (or portable) access devices disclosed herein. Although the following operations of FIG. 11 are primarily described with respect to the implementations of FIGS. 1-5, the operations may be easily modified to apply to other implementations of the present disclosure. The operations may be iteratively performed. The method of FIG. 11 may be performed while the method of FIG. 10 is being performed. The operations of FIG. 11 may be performed by a control module and/or range module of the mobile access device.

The method may begin at 1100. At 1102, the mobile access device transmits via a BLE transceiver an advertisement signal to the vehicle. At 1104, the BLE transceiver of the mobile access device receives a connect signal and/or an authentication signal from the vehicle.

At 1106, the mobile access device initiates a range and/or location request exchange and transmits via a UWB transceiver a Ping signal to the vehicle, as described above. At 1108, the UWB transceiver of the mobile access device receives an ACK signal as described above from the vehicle.

At 1110, the UWB transceiver of the mobile access device transmits a range and/or location request signal to the vehicle. At 1112, the BLE or UWB transceiver of the mobile access device receives a distance signal from the vehicle indicating a distance between the mobile access device and the vehicle. The method may end at 1114.

Figure 12:
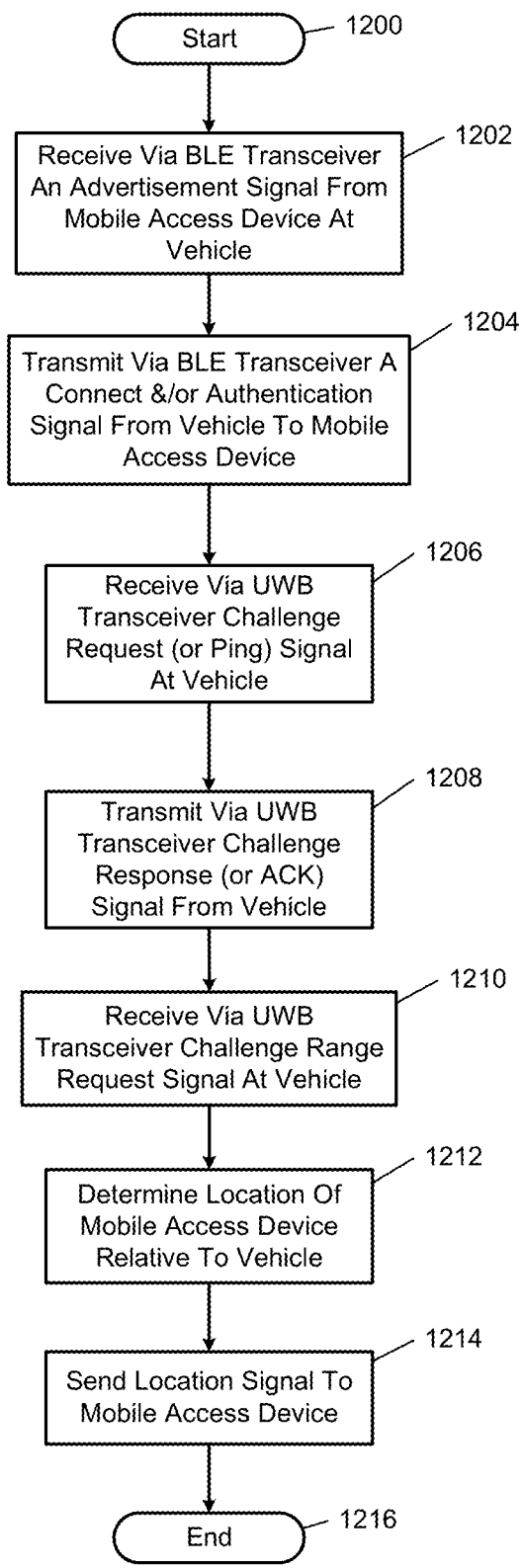
FIG. 12 illustrates a method of operating an access system of a vehicle in accordance with the present disclosure.

FIG. 12 illustrate a method of operating an access system of a vehicle, such as that shown in FIG. 2. The access module and/or location module of the vehicle may perform the below describe operations. The method may begin at 1200. At 1202, the BLE transceiver of the vehicle receives the advertisement signal from the mobile access device. At 1204, the BLE transceiver, in response, transmits the connect signal and/or authentication signal from the vehicle to the mobile access device.

At 1206, the UWB transceiver receives the Ping signal from the mobile access device. At 1208, the UWB transceiver, in response, transmits an ACK signal to the mobile access device. At 1210, the UWB transceiver may receive a range request signal from the mobile access device. At 1212, the access module and/or location module determines a location of the mobile access device relative to the vehicle and/or a distance between the vehicle and the mobile access device.

At 1214, the access module and/or location module via the BLE transceiver or the UWB transceiver transmits a distance signal indicating the distance to the mobile access device. The method may end at 1216.

The above-described operations of FIGS. 6-9 and 11-12 are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

A mobile access device is provided and includes a memory, a user interface, a transceiver, and a control module. The memory is configured to store a service application. The user interface is configured to receive an input from a user to execute the service application. The transceiver is configured to signal a vehicle to establish a connection and initiate a location determining process to determine a location of the mobile access device within the vehicle. The control module is configured to: determine whether the service application is permitted to be executed based on the location of the mobile access device; based on the location of the mobile access device, perform an identity verification process to verify identity of at least one of the user or the mobile access device; and track driving behavior of the user based on (i) whether the service application is permitted to be executed, and (ii) a result of the identity verification process.

In other features, the service application is a passenger or package transport service application.

In other features, the control module is configured to via the transceiver perform an ultra-wideband signal exchange with a module of the vehicle to determine the location of the mobile access device.

In other features, the control module is configured to determine the location of the mobile access device within the vehicle independent of the vehicle.

In other features, the mobile access device further includes one or more cameras. The control module is configured to determine the location of the mobile access device within the vehicle based on images captured via the one or more cameras.

In other features, the control module is configured to cease executing the service application when the mobile access device is outside a predetermined area of a driver seat of the vehicle.

In other features, the mobile access device further includes one or more cameras. The control module is configured to: capture images via the one or more cameras; based on the images, determine whether the user is driving the vehicle; and cease operation of the service application, in response to determining the user is not driving the vehicle.

In other features, the transceiver is configured to receive a signal from the vehicle. The signal indicates whether the user is likely driving the vehicle. The control module is configured to cease executing the service application in response to determining the user is likely not driving the vehicle.

In other features, the control module is configured to: track and report driving behavior to a station of a service company associated with the service application; receive a response signal from the station based on the reported driving behavior; and based on the response signal, indicate to the user at least one of (i) suggested driving behavior changes, (ii) an indicator to return the vehicle to the station, or (iii) information indicating operation of the vehicle is now limited.

In other features, the control module is configured to: track and report driving behavior to a station of an insurance company associated with at least one of the user or the vehicle; receive a response signal from the station based on the reported driving behavior; and based on the response signal, indicate to the user at least one of (i) suggested driving behavior changes or (ii) insurance rates.

In other features, an access system for a vehicle is provided. The access system includes a transceiver and a control module. The transceiver is configured to receive from a mobile access device a first signal indicating a service application at least one of has started or has been requested to start on the mobile access device. The control module is configured to: based on the first signal, determine a location of the mobile access device; determine whether the mobile access device is within a vicinity of a driver seat of the vehicle; in response to determining the mobile access device is within the vicinity of the driver seat, determining a likelihood that a user of the mobile access device is a current driver of the vehicle and authorized to use the service application; and indicate to the mobile access device via the transceiver at least one of (i) whether the mobile access device is within the vicinity of the driver seat, or (ii) the likelihood the user of the mobile access device is a current driver of the vehicle and is authorized to use the service application.

In other features, the control module is configured to perform an ultra-wideband signal exchange with the mobile access device to determine the location of the mobile access device within the vehicle.

In other features, the control module is configured to determine the location of the mobile access device within the vehicle based on images captured by the mobile access device.

In other features, the access system further includes one or more cameras configured to capture images of an interior of the vehicle. The control module is configured to, based on the captured images, determine a location of the mobile access device within the vehicle.

In other features, the control module is configured to signal the mobile access device to initiate an identity verification process based on whether the mobile access device is within the vicinity of the driver seat.

In other features, the control module is configured to: at least one of receive or obtain images of an interior of the vehicle; determine based on the images whether the mobile access device is facing a driver of the vehicle; and based on whether the mobile access device is facing the driver of the vehicle, signal the mobile access device to initiate an identity verification process to verify an identity of the user.

In other features, the control module is configured to: determine whether there is a passenger in a front passenger seat of the vehicle; and based on whether a passenger is in the front passenger seat of the vehicle, signal the mobile access device initiate an identity verification process to verify an identity of the user.

In other features, the control module is configured to: determine a probability of whether the user is the current driver of the vehicle, the user is a correct driver, or the user is an authorized driver of the vehicle; and based on the probability and to cease operation of the service application, signal the mobile access device at least one of (i) an indication that the user is not the current driver of the vehicle, (ii) an indication that the user is an incorrect driver, or (iii) the user is not an authorized driver of the vehicle.

In other features, the control module is configured to: track and report driving behavior to a station of a service company associated with the service application; receive a response signal from the station based on the reported driving behavior; and based on the response signal, indicate information to the user via at least one of the mobile access device or an interface of the vehicle, wherein the information includes at least one of (i) suggested driving behavior changes, (ii) an indicator to return the vehicle to the station, or (iii) information indicating operation of the vehicle is now limited.

In other features, the control module is configured to: track and report driving behavior to a station of an insurance company associated with at least one of the user or the vehicle; receive a response signal from the station based on the reported driving behavior; and based on the response signal, indicate information to the user via at least one of the mobile access device or an interface of the vehicle, wherein the information includes at least one of (i) suggested driving behavior changes or (ii) insurance rates.

Although the terms first, second, third, etc. may be used herein to describe various distances, boundaries, rates, periods, steps, elements, components, regions, areas and/or sections, these distances, boundaries, rates, periods, steps, elements, components, regions, areas and/or sections should not be limited by these terms, unless otherwise indicated. These terms may be only used to distinguish one distance, boundary, rate, period, step, element, component, region, area or section from another step, element, component, region, area or section. Terms such as "first," "second," and other numerical terms when used herein do not imply a sequence or order unless clearly indicated by the context. Thus, a first distance, boundary, rate, period, step, element, component, region, area or section discussed below could be termed a second distance, boundary, rate, period, step, element, component, region, area or section without departing from the teachings of the example embodiments.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A mobile access device comprising:
    a memory configured to store a service application;
    a user interface configured to receive an input from a user to execute the service application;
    a transceiver configured to signal a vehicle to establish a connection and initiate a location determining process to determine a location of the mobile access device within the vehicle; and
    a control module configured to
        based on the location of the mobile access device, i) execute the service application, and ii) perform an identity verification process to verify identity of at least one of the user or the mobile access device, and
        track driving behavior of the user based on (i) whether the service application is permitted to be executed, and (ii) a result of the identity verification process.

2. The mobile access device of claim 1, wherein the service application is a passenger or package transport service application.

3. The mobile access device of claim 1, the control module is configured to via the transceiver perform an ultra-wideband signal exchange with a module of the vehicle to determine the location of the mobile access device.

4. The mobile access device of claim 1, the control module is configured to determine the location of the mobile access device within the vehicle independent of the vehicle.

5. The mobile access device of claim 1, further comprising one or more cameras,
    wherein the control module is configured to determine the location of the mobile access device within the vehicle based on images captured via the one or more cameras.

6. The mobile access device of claim 1, wherein control module is configured to cease executing the service application when the mobile access device is outside a predetermined area of a driver seat of the vehicle.

7. The mobile access device of claim 1, further comprising one or more cameras,
    wherein the control module is configured to
        capture images via the one or more cameras,
        based on the images, determine whether the user is driving the vehicle, and
        cease operation of the service application, in response to determining the user is not driving the vehicle.

8. The mobile access device of claim 1, wherein:
    the transceiver is configured to receive a signal from the vehicle;
    the signal indicates whether the user is likely driving the vehicle; and
    the control module is configured to cease executing the service application in response to determining the user is likely not driving the vehicle.

9. The mobile access device of claim 1, wherein the control module is configured to:
    track and report driving behavior to a station of a service company associated with the service application;
    receive a response signal from the station based on the reported driving behavior; and
    based on the response signal, indicate to the user at least one of (i) suggested driving behavior changes, (ii) an indicator to return the vehicle to the station, or (iii) information indicating operation of the vehicle is now limited.

10. The mobile access device of claim 1, wherein the control module is configured to:
    track and report driving behavior to a station of an insurance company associated with at least one of the user or the vehicle;
    receive a response signal from the station based on the reported driving behavior; and
    based on the response signal, indicate to the user at least one of (i) suggested driving behavior changes or (ii) insurance rates.

11. An access system for a vehicle, the access system comprising:
    a transceiver configured to receive from a mobile access device a first signal indicating a service application at least one of has started or has been requested to start on the mobile access device; and
    a control module configured to
        based on the first signal, determine a location of the mobile access device,
        determine whether the mobile access device is within a vicinity of a driver seat of the vehicle,
        in response to determining the mobile access device is within the vicinity of the driver seat, determining a likelihood that a user of the mobile access device is a current driver of the vehicle and authorized to use the service application, and
        indicate to the mobile access device via the transceiver at least one of (i) whether the mobile access device is within the vicinity of the driver seat, or (ii) the likelihood the user of the mobile access device is a current driver of the vehicle and is authorized to use the service application.

12. The access system of claim 11, wherein the control module is configured to perform an ultra-wideband signal exchange with the mobile access device to determine the location of the mobile access device within the vehicle.

13. The access system of claim 11, wherein the control module is configured to determine the location of the mobile access device within the vehicle based on images captured by the mobile access device.

14. The access system of claim 11, further comprising one or more cameras configured to capture images of an interior of the vehicle, wherein the control module is configured to, based on the captured images, determine a location of the mobile access device within the vehicle.

15. The access system of claim 11, wherein the control module is configured to signal the mobile access device to initiate an identity verification process based on whether the mobile access device is within the vicinity of the driver seat.

16. The access system of claim 11, wherein the control module is configured to:
   at least one of receive or obtain images of an interior of the vehicle;
   determine based on the images whether the mobile access device is facing a driver of the vehicle; and
   based on whether the mobile access device is facing the driver of the vehicle, signal the mobile access device to initiate an identity verification process to verify an identity of the user.

17. The access system of claim 11, wherein the control module is configured to:
   determine whether there is a passenger in a front passenger seat of the vehicle; and
   based on whether a passenger is in the front passenger seat of the vehicle, signal the mobile access device initiate an identity verification process to verify an identity of the user.

18. The access system of claim 11, wherein the control module is configured to:
   determine a probability of whether the user is the current driver of the vehicle, the user is a correct driver, or the user is an authorized driver of the vehicle; and
   based on the probability and to cease operation of the service application, signal the mobile access device at least one of (i) an indication that the user is not the current driver of the vehicle, (ii) an indication that the user is an incorrect driver, or (iii) the user is not an authorized driver of the vehicle.

19. The access system of claim 11, wherein the control module is configured to:
   track and report driving behavior to a station of a service company associated with the service application;
   receive a response signal from the station based on the reported driving behavior; and
   based on the response signal, indicate information to the user via at least one of the mobile access device or an interface of the vehicle, wherein the information includes at least one of (i) suggested driving behavior changes, (ii) an indicator to return the vehicle to the station, or (iii) information indicating operation of the vehicle is now limited.

20. The access system of claim 11, wherein the control module is configured to:
   track and report driving behavior to a station of an insurance company associated with at least one of the user or the vehicle;
   receive a response signal from the station based on the reported driving behavior; and
   based on the response signal, indicate information to the user via at least one of the mobile access device or an interface of the vehicle, wherein the information includes at least one of (i) suggested driving behavior changes or (ii) insurance rates.

* * * * *